US012803912B2

(12) United States Patent
Guo et al.

(10) Patent No.: US 12,803,912 B2
(45) Date of Patent: Nov. 17, 2026

(54) CLOUD SYSTEM, PACKET PROCESSING METHOD AND APPARATUS, AND NETWORK INTERFACE CARD

(71) Applicant: Huawei Cloud Computing Technologies Co., Ltd., Guizhou (CN)

(72) Inventors: Hongzhi Guo, Hangzhou (CN); Xiaoqiu Gao, Hangzhou (CN); Xiao Li, Hangzhou (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 27 days.

(21) Appl. No.: 19/010,634

(22) Filed: Jan. 6, 2025

(65) Prior Publication Data

US 2025/0141803 A1 May 1, 2025

Related U.S. Application Data

(63) Continuation of application No. PCT/CN2023/086557, filed on Apr. 6, 2023.

(30) Foreign Application Priority Data

Jul. 6, 2022 (CN) ......................... 202210788663.9
Sep. 30, 2022 (CN) ......................... 202211210642.5

(51) Int. Cl.
*H04L 45/76* (2022.01)
*H04L 12/46* (2006.01)
*H04L 45/74* (2022.01)

(52) U.S. Cl.
CPC .......... *H04L 45/76* (2022.05); *H04L 12/4633* (2013.01); *H04L 45/74* (2013.01)

(58) Field of Classification Search
CPC ...... H04L 45/76; H04L 12/4633; H04L 45/74
See application file for complete search history.

(56) References Cited

U.S. PATENT DOCUMENTS 10,104,018 B2 * 10/2018 Zhou .................. H04L 12/4641
2020/0110626 A1 * 4/2020 Kochevar-Cureton ...................... H04L 12/4645

FOREIGN PATENT DOCUMENTS

EP 2828760 B1 1/2019

OTHER PUBLICATIONS

Kaushik Kumar Ram et al, "sNICh: Efficient last hop networking in the data center," Oct. 25, 2010, pp. 1-12, XP031791738.

* cited by examiner

*Primary Examiner* — Bryan Y Lee
(74) *Attorney, Agent, or Firm* — Conley Rose, P.C.

(57) ABSTRACT

A cloud system includes a computing node, configured to insert a network interface card and run a first virtual instance, where the network interface card is configured to receive a first packet in a first data flow; a network controller configured to send tenant network information of at least one virtual instance on one or more VPCs to a first central node, where the network interface card is further configured to send the first packet to the first central node; and the first central node, configured to generate the first packet processing rule corresponding to the first data flow, where the network interface card is further configured to receive and locally record the first packet processing rule from the first central node in order to process and/or forward a packet after the first packet in the first data flow.

20 Claims, 9 Drawing Sheets

CLOUD SYSTEM, PACKET PROCESSING METHOD AND APPARATUS, AND NETWORK INTERFACE CARD

CROSS-REFERENCE TO RELATED APPLICATIONS

This is a continuation of International Patent Application No. PCT/CN2023/086557 filed on Apr. 6, 2023, which claims priority to Chinese Patent Application No. 202210788663.9 filed on Jul. 6, 2022, and Chinese Patent Application No. 202211210642.5 filed on Sep. 30, 2022. All of the aforementioned patent applications are hereby incorporated by reference in their entireties.

TECHNICAL FIELD

This application relates to the network communication field, and in particular, to a cloud system, a packet processing method and apparatus, and a network interface card.

BACKGROUND

A virtual switch plays a very important role in the cloud computing field, and aims to implement large-scale network automation by orchestrating a packet processing rule, to implement distribution of complex service packets in a cloud network scenario.

The virtual switch is usually deployed on a computing node on which a virtual instance runs, and a specific quantity of computing resources is consumed to implement a function of the virtual switch. The virtual instance may be a virtual machine (VM), a container, or the like. However, after limited computing resources and storage resources on the computing node are occupied by a control and management function, a forwarding function, and a large quantity of packet processing rules that are of the virtual switch, resources that can be reserved for a tenant to use are greatly reduced. How to control resource occupation of the computing node becomes an urgent problem to be resolved.

SUMMARY

This application provides a cloud system, a packet processing method and apparatus, and a network interface card, to reduce computing resource occupation of a computing node, so that the computing node can provide more computing resources for a tenant to use.

According to a first aspect, this application provides a cloud system, including: a computing node, configured to: insert a network interface card and run a first virtual instance; the network interface card, configured to receive a first packet in a first data flow, where a destination address of the first packet is a network address of the first virtual instance, a source address of the first packet is a network address of a second virtual instance, and the first packet is an initial packet in the first data flow; a network controller, configured to send tenant network information of at least one virtual instance on one or more virtual private clouds (VPCs) to a first central node. The network interface card is further configured to: when determining that a packet processing rule of the first packet is not locally recorded, send the first packet to the first central node that records the tenant network information of the at least one virtual instance on the one or more VPCs, where the at least one virtual instance includes the first virtual instance and the second virtual instance. The first central node is configured to: receive the first packet, generate, based on the tenant network information of the at least one virtual instance on the one or more VPCs, the first packet processing rule corresponding to the first data flow, and process and/or forward the first packet according to the first packet processing rule. The network interface card is further configured to: receive the first packet processing rule sent by the first central node, and locally record the first packet processing rule. The network interface card is further configured to: process and/or forward, according to the first packet processing rule, a packet after the first packet in the first data flow.

In other words, a packet processing function of a virtual switch is offloaded to the network interface card on the computing node, and the network interface card is responsible for performing corresponding packet processing and/or forwarding according to a locally stored packet processing rule. If the network interface card receives a packet (it is assumed that the packet is the first packet in the first data flow), but does not locally have the packet processing rule (that is, a packet processing rule that can match the first packet) of the first packet to guide how to process the first packet, the network interface card sends the first packet to the first central node (the first central node locally records the tenant network information of the at least one virtual instance on the one or more VPCs, where the tenant network information includes tenant network information that are of the first virtual instance and the second virtual instance), to obtain a corresponding packet processing rule on the first central node through learning. After receiving the first packet sent by the network interface card, the first central node may generate, based on the foregoing locally recorded information, the first packet processing rule corresponding to the first data flow. The first packet processing rule is used to guide how to process and/or forward a packet in the first data flow. Then, the first central node sends the generated first packet processing rule to the network interface card. The network interface card locally records the received first packet processing rule, to process and/or forward, according to the locally recorded first packet processing rule, a subsequently received packet in the first data flow.

In this solution, the network controller sends the tenant network information of the at least one virtual instance on the one or more VPCs to the first central node, so that the first central node can generate, based on the foregoing information, a forwarding rule needed by the computing node, and the network controller does not need to be responsible for offloading the needed forwarding rule to each computing node. This reduces pressure of the network controller. Because the network controller does not need to send location information of a large quantity of instances to each computing node carrying an instance, memory usage of the computing node is reduced.

In addition, because packet processing rule generation and offloading are all implemented by the remote first central node instead of being locally implemented on the computing node, consumption of central processing unit (CPU) resources of the computing node is reduced. In this way, more computing resources can be reserved for a tenant to use, and more virtual instances can be created for the tenant on the computing node. The network interface card on the computing node may only need to perform corresponding packet processing and/or forwarding according to a packet processing rule remotely offloaded by the first central node. This simplifies a function of the computing node, improves reliability of the computing node, facilitates lightweight upgrade of the computing node, and reduces costs of the computing node.

According to the first aspect, in a possible implementation solution, if the tenant network information of the at least one virtual instance on the one or more VPCs includes one or any combination of a subnet forwarding location table, a cross-subnet layer-3 forwarding location table, a security group rule, an access control list (ACL) rule, and link session information that are of the at least one virtual instance on the one or more VPCs, the first central node is configured to generate the first packet processing rule based on the one or any combination of the subnet forwarding location table, the cross-subnet layer-3 forwarding location table, the security group rule, the ACL rule, and the link session information that are of the at least one virtual instance on the one or more VPCs.

It may be learned that the tenant network information of the at least one virtual instance on the one or more VPCs may include a large amount of content, and a data volume is usually large. In this embodiment of this application, the foregoing information is recorded on the first central node instead of the computing node, so that the memory usage of the computing node can be greatly reduced. In addition, because a large amount of the foregoing information does not need to be delivered to the computing node, a creation speed of a virtual instance on the computing node can be significantly improved.

According to the first aspect, in a possible implementation solution, the network interface card is further configured to: determine the first central node from a central node cluster, where the central node cluster includes a plurality of central nodes, and each of the plurality of central nodes records the tenant network information of the at least one virtual instance on the one or more VPCs.

In this solution, the central nodes may be deployed in a cluster manner. Each central node has the tenant network information of the at least one virtual instance on the one or more VPCs, and may provide, for the network interface card on the computing node, a service of offloading a provided packet processing rule. When the network interface card finds that no packet processing rule that can match a currently received packet is locally recorded, the network interface card/computing node on which the network interface card is located may select one central node from the plurality of central nodes, that is, determine the first central node, and further forward the packet to the first central node, so that the first central node sends a corresponding packet processing rule to the network interface card. It should be understood that, in this solution, requirements of network interface cards on different computing nodes on offloading packet processing rules may be distributed to different central nodes, so that pressure of each central node can be reduced to some extent, and load balancing can be implemented. Therefore, availability of the central node can be improved.

According to the first aspect, in a possible implementation solution, the network interface card is configured to: first determine a central node in an online state from the plurality of central nodes, and then determine the first central node from the central node in the online state.

It should be understood that the central node may be temporarily in an offline state due to a factor such as a fault, an upgrade, or a restart, and the central node in the offline state temporarily cannot provide a packet processing rule offloading service for the network interface card. In this solution, the network interface card may first determine respective statuses of the plurality of central nodes, for example, detect a status of each central node by using a heartbeat keepalive mechanism, then exclude the central node in the offline state, and determine the first central node only from the online central node. It may be understood that the network interface card in this solution sends the first packet only to the online central node, to ensure that the provided packet processing rule can be obtained through learning, so that fault isolation or hitless upgrade of the central node can be implemented, in other words, offline of a central node does not affect the network interface card to obtain the provided packet processing rule, and reliability is high.

According to the first aspect, in a possible implementation solution, the network interface card is configured to: receive a second packet in the first data flow, and forward the second packet to the first virtual instance according to the locally recorded first packet processing rule, where the second packet is a packet after the first packet (that is, the initial packet) in the first data flow.

In other words, after the first central node sends the first packet processing rule corresponding to the first data flow to the network interface card, and the network interface card locally records the first packet processing rule, when the network interface card receives a subsequent packet in the first data flow, the network interface card may directly forward the packet to the first virtual instance according to the locally recorded first packet processing rule (in other words, the first packet processing rule in this case indicates how to forward the packet in the first data flow), so that fast forwarding is implemented, and the packet does not need to be sent to the central node.

According to the first aspect, in a possible implementation solution, the first central node is further configured to: generate a tunneling protocol packet carrying the first packet processing rule, and then send the tunneling protocol packet to the network interface card. Correspondingly, the network interface card is further configured to: receive the tunneling protocol packet sent by the first central node, obtain the first packet processing rule based on the tunneling protocol packet, and locally record the first packet processing rule.

In this solution, the first central node may send a packet processing rule to the network interface card on the computing node by using a tunneling protocol. The tunneling protocol may be a Virtual extensible LAN-generic protocol encapsulation (VXLAN-GPE) protocol, a generic routing encapsulation (GRE) protocol, or the like. This is not limited in this application. It should be understood that the first central node offloads the packet processing rule to the network interface card on the computing node by using the tunneling protocol, and the network interface card decapsulates the tunneling protocol packet, and locally installs the obtained packet processing rule without being processed by a kernel protocol stack of the computing node on which the network interface card is located. In this way, a CPU resource of the computing node is not occupied, and efficiency of offloading the packet processing rule can be improved.

According to the first aspect, in a possible implementation solution, tenant network information of the first virtual instance includes an access control rule corresponding to the first virtual instance, the access control rule includes a security group rule and/or an ACL rule, and the first central node is configured to generate the first packet processing rule when determining, based on the source address of the first packet and the access control rule corresponding to the first virtual instance, that the packet in the first data flow is not allowed to pass through, where the first packet processing rule indicates to discard the packet in the first data flow.

The access control rule is used to implement an access control check function, and may be customized by the tenant, to ensure network security. For example, the access control rule may be the security group rule, the ACL rule, or the like, to control a data flow that enters/leaves a virtual instance or enters/leaves a subnet on which the virtual instance is located. This implements security protection to some extent.

In this solution, the first central node records an access control rule corresponding to the at least one virtual instance on the one or more VPCs. Therefore, the first central node may perform the corresponding access control check function based on the access control rule. When receiving a packet sent by the network interface card, the first central node may determine, based on a source address carried in the packet and an access control rule corresponding to a virtual instance indicated by a destination address of the packet, whether the packet is allowed to pass through. If determining that the packet is not allowed to pass through, the first central node may directly discard the packet, generate a packet forwarding rule, and send the packet forwarding rule to the network interface card. The packet forwarding rule indicates to perform a discard operation on a subsequent packet in a data flow in which the packet is located, and a forwarding operation does not need to be performed, so that a requirement of an access control rule set by a tenant is met, and corresponding security protection is implemented.

According to the first aspect, in a possible implementation solution, the network interface card is further configured to: when determining that the locally recorded first packet processing rule meets an expiration condition, delete the locally recorded first packet processing rule.

In other words, an expiration mechanism (or referred to as an aging mechanism/survival mechanism) for the packet processing rule is set on the network interface card. When a packet processing rule recorded on the network interface card meets the expiration condition, the network interface card deletes the packet processing rule, to save storage resources. The expiration condition may be that storage duration exceeds preset duration (or referred to as expiration time/survival time), or non-matching duration exceeds a preset value. This is not limited in this application.

According to the first aspect, in a possible implementation solution, the first central node is further configured to generate a first session entry corresponding to the first data flow, where the first session entry includes the first packet processing rule. After deleting the locally recorded first packet processing rule, the network interface card is further configured to: receive a third packet in the first data flow, and when determining that a packet processing rule of the third packet is not locally recorded, send the third packet to the first central node, where the third packet is a packet after the first packet in the first data flow. The first central node is further configured to: when determining that the third packet is in the first data flow corresponding to the first session entry, send the first packet processing rule in the first session entry to the network interface card.

In this solution, the first central node is further responsible for implementing a session matching function. When the network interface card sends the initial packet (namely, the first packet) in the first data flow to the first central node, the first central node first performs a corresponding access control check according to the access control rule in the tenant network information of the first virtual instance indicated by the destination address of the first packet, determines that the first packet is a packet that is allowed to pass through, then generate a first packet forwarding rule corresponding to a first quantity based on the tenant network information of the first virtual instance, and further generate a session entry corresponding to the first data flow. The session entry includes the first packet processing rule, and records a connection status from a source virtual instance (a virtual instance indicated by the source address of the first packet) of the first packet to a destination virtual instance (a virtual instance indicated by the destination address of the first packet). For example, the connection status may be a connection status of a protocol such as a transmission control protocol (TCP), a user datagram protocol (UDP), or an Internet control message protocol (ICMP).

The network interface card receives and locally records the first packet forwarding rule sent by the first central node, to perform corresponding processing and/or forwarding on a subsequently received packet in the first data flow. When the first packet forwarding rule recorded on the network interface card meets the expiration condition, the network interface card automatically deletes the locally recorded first packet forwarding rule. However, if the network interface card receives the packet in the first data flow (a subsequent packet of the first packet) again, but the network interface card does not have a packet processing rule corresponding to the first data flow locally, the network interface card cannot determine how to process the packet. In this case, the network interface card sends the packet to the first central node, to obtain the corresponding packet processing rule through learning again. When receiving the packet, the first central node first queries a session table to determine whether the packet has a matched session entry in the session table. The first central node determines that the packet matches a previously generated session entry, that is, determines that the packet belongs to a data flow/connection corresponding to the session entry, then obtains the first packet processing rule based on the session entry, and further sends the first packet processing rule to the network interface card for storage again. It should be understood that, in this solution, the first central node may only need to perform an access control check on an initial packet in a data flow, that is, may record a connection status (a session entry). When a subsequent packet in the data flow arrives at the first central node, the first central node may only need to determine a corresponding packet processing rule based on the previously generated session entry, and the access control check does not need to be performed again, so that the efficiency of offloading the packet processing rule can be improved.

According to the first aspect, in a possible implementation solution, the network interface card is provided with a processor and a memory, and the processor executes instructions in the memory to run an operating system of the network interface card.

According to a second aspect, this application further provides a packet forwarding method. The method includes: A network interface card receives a first packet in a first data flow, where the network interface card is inserted into a computing node on which a first virtual instance runs, a destination address of the first packet is a network address of the first virtual instance, a source address of the first packet is a network address of a second virtual instance, and the first packet is an initial packet in the first data flow. When determining that a packet processing rule of the first packet is not locally recorded, the network interface card sends the first packet to a first central node that records tenant network information of at least one virtual instance on one or more VPCs, where the at least one virtual instance includes the first virtual instance and the second virtual instance. The network interface card receives the first packet processing rule sent by the first central node, and locally records the first packet processing rule. The network interface card processes and/or forwards, according to the first packet processing rule, a packet after the first packet in the first data flow.

According to the second aspect, in a possible implementation solution, the tenant network information of the at least one virtual instance on the one or more VPCs includes one or any combination of a subnet forwarding location table, a cross-subnet layer-3 forwarding location table, a security group rule, an ACL rule, and link session information that are of the at least one virtual instance on the one or more VPCs.

According to the second aspect, in a possible implementation solution, before sending the first packet to the first central node that records the tenant network information of the at least one virtual instance on the one or more VPCs, the method further includes: The network interface card determines the first central node from a central node cluster, where the central node cluster includes a plurality of central nodes, and each of the plurality of central nodes records the tenant network information of the at least one virtual instance on the one or more VPCs.

According to the second aspect, in a possible implementation solution, that the network interface card determines the first central node from a central node cluster includes: The network interface card determines a central node in an online state from the plurality of central nodes, and determines the first central node from the central node in the online state.

According to the second aspect, in a possible implementation solution, that the network interface card processes and/or forwards, according to the first packet processing rule, a packet after the first packet in the first data flow includes: The network interface card receives a second packet in the first data flow, and forwards the second packet to the first virtual instance according to the locally recorded first packet processing rule, where the second packet is a packet after the first packet in the first data flow.

According to the second aspect, in a possible implementation solution, that the network interface card receives the first packet processing rule that corresponds to the first data flow and that is sent by the first central node, and locally records the first packet processing rule includes: The network interface card receives a tunneling protocol packet that is sent by the first central node and that carries the first packet processing rule corresponding to the first data flow. The network interface card obtains the first packet processing rule based on the tunneling protocol packet, and locally records the first packet processing rule.

According to the second aspect, in a possible implementation solution, the method further includes: When determining that the locally recorded first packet processing rule meets an expiration condition, the network interface card deletes the locally recorded first packet processing rule.

According to the second aspect, in a possible implementation solution, after the network interface card deletes the locally recorded first packet processing rule, the method further includes: The network interface card receives a third packet in the first data flow, where the third packet is a packet after the first packet in the first data flow. When determining that a packet processing rule of the third packet is not locally recorded, the network interface card sends the third packet to the first central node.

According to the second aspect, in a possible implementation solution, the network interface card is provided with a processor and a memory, and the processor executes instructions in the memory to run an operating system of the network interface card.

According to a third aspect, this application further provides a packet processing apparatus. The apparatus includes: a receiving module, configured to receive a first packet in a first data flow, where the apparatus is inserted into a computing node on which a first virtual instance runs, a destination address of the first packet is a network address of the first virtual instance, a source address of the first packet is a network address of a second virtual instance, and the first packet is an initial packet in the first data flow; and a processing module, configured to: when determining that a packet processing rule of the first packet is not locally recorded, send the first packet to a first central node that records tenant network information of at least one virtual instance on one or more VPCs, where the at least one virtual instance includes the first virtual instance and the second virtual instance. The receiving module is further configured to receive the first packet processing rule sent by the first central node. The processing module is further configured to locally record the first packet processing rule in the apparatus. The processing module is further configured to: process and/or forward, according to the first packet processing rule, a packet after the first packet in the first data flow.

According to the third aspect, in a possible implementation solution, the tenant network information of the at least one virtual instance on the one or more VPCs includes one or any combination of a subnet forwarding location table, a cross-subnet layer-3 forwarding location table, a security group rule, an ACL rule, and link session information that are of the at least one virtual instance on the one or more VPCs.

According to the third aspect, in a possible implementation solution, the processing module is further configured to: determine the first central node from a central node cluster, where the central node cluster includes a plurality of central nodes, and each of the plurality of central nodes records the tenant network information of the at least one virtual instance on the one or more VPCs.

According to the third aspect, in a possible implementation solution, the processing module is configured to: determine a central node in an online state from the plurality of central nodes, and determine the first central node from the central node in the online state.

According to the third aspect, in a possible implementation solution, the receiving module is further configured to receive a second packet in the first data flow. The processing module is configured to forward the second packet to the first virtual instance according to the first packet processing rule locally recorded in the apparatus, where the second packet is a packet after the first packet in the first data flow.

According to the third aspect, in a possible implementation solution, the receiving module is configured to receive a tunneling protocol packet that is sent by the first central node and that carries the first packet processing rule corresponding to the first data flow. The processing module is configured to: obtain the first packet processing rule based on the tunneling protocol packet, and locally record the first packet processing rule in the apparatus.

According to the third aspect, in a possible implementation solution, the processing module is further configured to: when determining that the locally recorded first packet processing rule meets an expiration condition, delete the first packet processing rule locally recorded in the apparatus.

According to the third aspect, in a possible implementation solution, the receiving module is further configured to receive a third packet in the first data flow, where the third packet is a packet after the first packet in the first data flow. The processing module is further configured to: when determining that a packet processing rule of the third packet is not locally recorded, send the third packet to the first central node.

According to the third aspect, in a possible implementation solution, the apparatus is provided with a processor and a memory, and the processor executes instructions in the memory to run an operating system of the apparatus.

According to a fourth aspect, this application further provides a network interface card, including a processor and a memory. The processor is configured to execute instructions stored in the memory, to enable the network interface card to perform the method according to any one of the possible implementation solutions of the second aspect.

DESCRIPTION OF EMBODIMENTS

The following describes an application scenario in embodiments of this application.

A physical network is generally a network established between computing nodes (for example, a computing device such as a physical server or a desktop computer) to enable data to be sent and received between the computing nodes, and generally includes a physical network device such as a switch or a router. A virtual network is a network formed for virtual instances (for example, virtual machines or containers) running on the computing node to communicate with each other and logically connect to each other. Based on a network virtualization technology, one or more virtual networks may be constructed on the physical network. Address space of the virtual network is decoupled from that of the physical network, and the physical network usually does not need to be changed.

Similar to a physical switch on the physical network, a virtual network also has a corresponding virtual switch to simulate a function of the physical switch. The virtual switch is usually deployed on a computing node on which a virtual instance runs. The virtual switch may forward data between different virtual instances on a same computing node, and may be further connected to the physical network by being connected to a physical network interface card on the computing node, to implement communication between virtual instances on different computing nodes. In other words, the virtual switch is a bridge between a virtual instance on the virtual network and the physical network, and the virtual instance is connected to the physical network via the virtual switch.

In a first implementation, all functions of the virtual switch are implemented by software (that is, all-function-software implementation).

Figure 1:
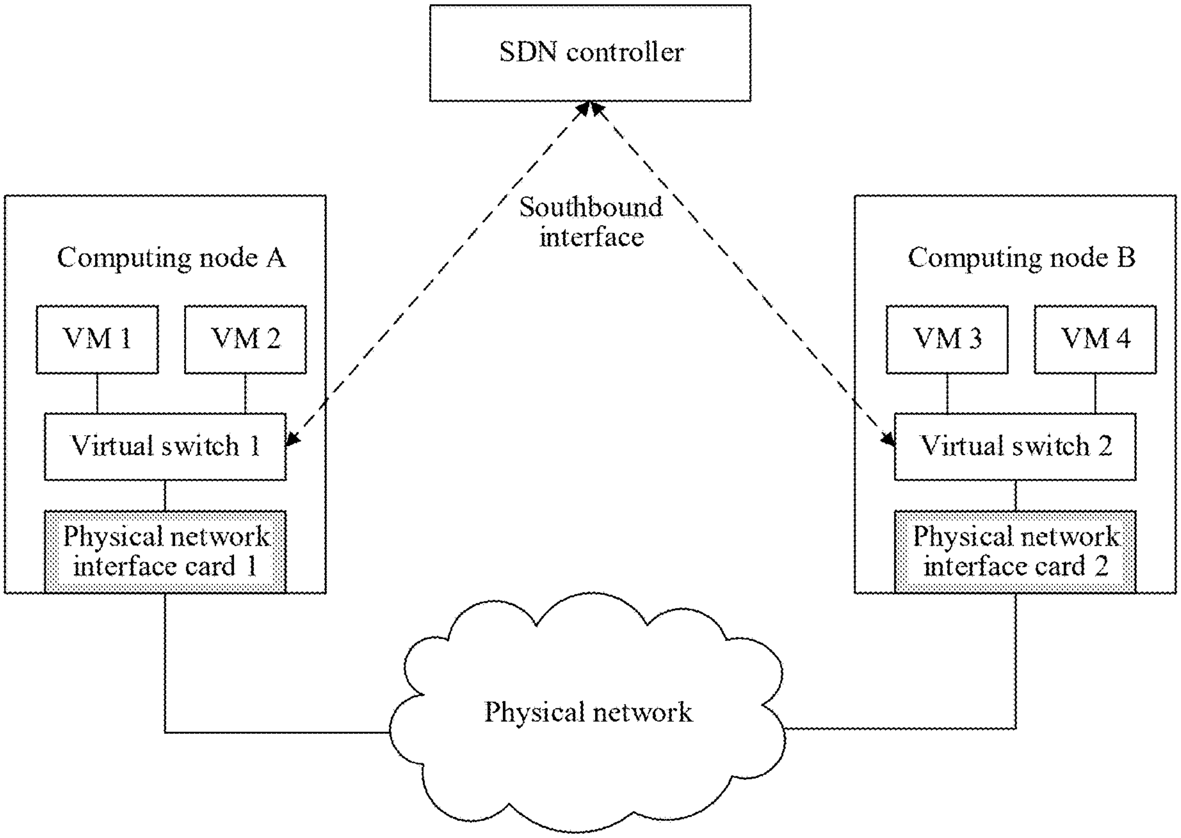
FIG. 1 is a diagram of an all-software implemented virtual switch according to an embodiment of this application.

For example, as shown in FIG. 1, a virtual switch 1 (a software program) runs on a computing node A, and two ends of the virtual switch 1 are separately connected to a physical network interface card 1, and virtual machines VM 1 and VM 2. The virtual switch 1 provides a virtual access port of a virtual machine internally, is connected to the physical network interface card 1 on the computing node A externally, and provides basic layer-2 and layer-3 network forwarding functions in a form of software for the virtual machine on the computing node A. Similarly, a virtual switch 2 (a software program) runs on a computing node B, and two ends of the virtual switch 2 are separately connected to a physical network interface card 2, and virtual machines VM 3 and VM 4.

In a software-defined network (SDN) architecture, a data plane and a control plane of a network may be separated. The control plane is implemented by an SDN controller, and a virtual switch is responsible for work of the data plane. The SDN controller delivers a corresponding packet processing rule, access control rule, and the like to each virtual switch (deployed on a computing node) through a southbound interface, to control data forwarding of each virtual switch. A communication interface between the control plane and the data plane in the SDN architecture is referred to as a "southbound interface", such as an OpenFlow protocol or a Network Configuration Protocol (NETCONF). As shown in FIG. 1, it is assumed that the VM 1 on the computing node A needs to communicate with the VM 3 on the computing node B, and the VM 1 sends an initial packet to the virtual switch 1. However, the virtual switch 1 does not find, in a local forwarding table, a packet processing rule that can match the packet. Therefore, the virtual switch 1 forwards the packet to the SDN controller through the southbound interface. Then, the SDN controller generates the corresponding packet processing rule based on the packet, and delivers the packet processing rule to the virtual switch 1 through the southbound interface. After the packet processing rule is delivered, the virtual switch 1 can process a subsequent packet sent by the VM 1 to the VM 3, and the VM 1 and the VM 3 can normally communicate with each other. In other words, both packet processing rule generation and delivery are implemented by the SDN controller, and the virtual switch may only need to perform a corresponding packet processing and/or forwarding operation according to the packet processing rule delivered by the SDN controller.

It may be understood that, in a service scenario in which a large quantity of virtual machines may need to be created, in the foregoing manner, the SDN controller is used to deliver related packet processing rules, access control rules, and the like to virtual switches on all computing nodes on which the virtual machines are located, to implement normal communication between the virtual machines. In this way, a corresponding business service is provided. However, the SDN controller delivers a single packet processing rule through the southbound interface at a millisecond level, and this part of time overheads has a great impact on a service. In addition, because the virtual switch is all-function-software implemented, functions are complex, reliability is poor, and consumption of CPU performance of the computing node is high, computing resources on the computing node that can be reserved for a tenant are greatly reduced.

In a second implementation, functions of the virtual switch may be jointly implemented by software and hardware.

Figure 2:
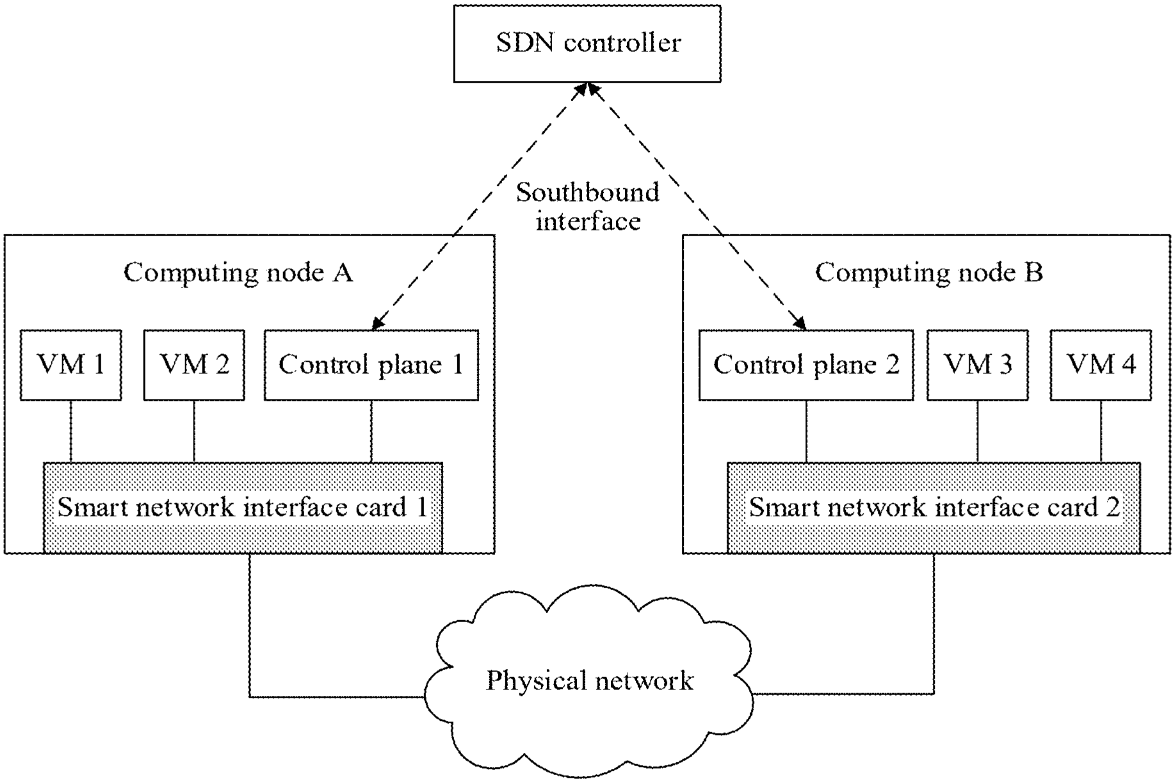
FIG. 2 is a diagram of a smart network interface card-based offloading solution according to an embodiment of this application.

For example, data plane functions (such as packet processing rule matching and packet processing/forwarding) of the virtual switch are offloaded to a smart network interface card (Smart-NIC), and control plane functions (such as packet processing rule generation and offloading) are implemented by software, to reduce consumption of CPU resources of the computing node by a function of the virtual switch. As shown in FIG. 2, it is assumed that virtual machines VM 1 and VM 2 on a computing node A respectively belong to a first virtual network and a second virtual network (another virtual machine included in the first virtual network and the second virtual network is located on another computing node). To implement communication between the VM 1 and another virtual machine on the first virtual network, and implement communication between the VM 2 and another virtual machine on the second virtual network, an SDN controller may need to send, to a control plane 1 on the computing node A, fuzzy forwarding rules, access control rules, and the like that are related to the first virtual network and the second virtual network, in other words, the SDN controller may need to deliver, to the computing node for storage, all fuzzy forwarding rules, access control rules, and the like that are related to all virtual networks on which virtual instances on the computing node are located.

Figure 3:
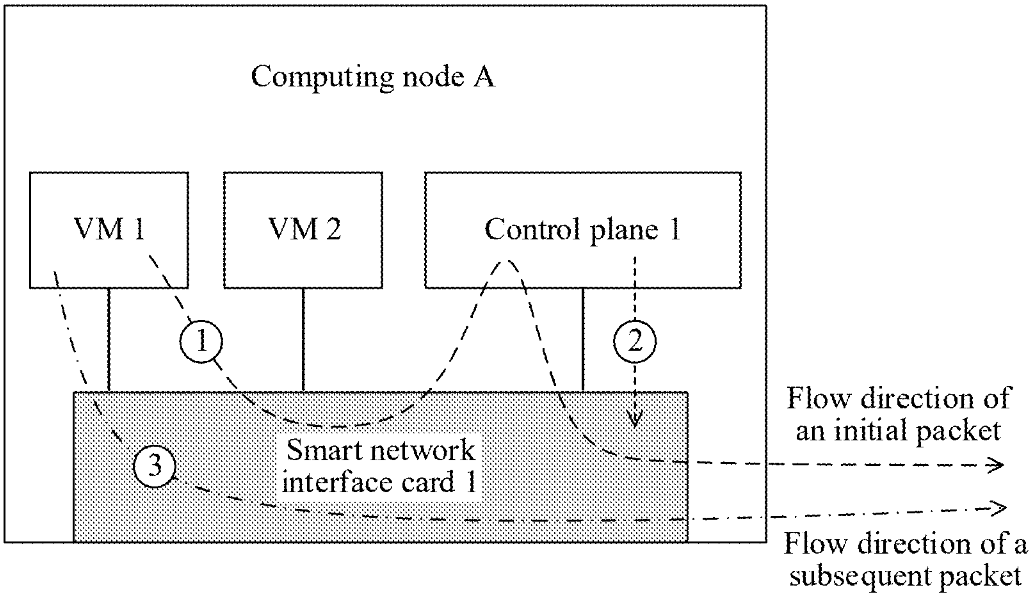
FIG. 3 is a diagram of flow directions of packets in a computing node according to an embodiment of this application.

In FIG. 2, it is assumed that the VM 1 on the computing node A needs to communicate with a VM 3 on a computing node B. Then, refer to step 1 in FIG. 3. The VM 1 may directly send an initial packet of current communication to a smart network interface card 1 in a passthrough manner implemented based on a single root input/output virtualization (SR-IOV) technology. However, a packet processing rule that matches the packet is not found in a forwarding table stored in the smart network interface card 1, and the smart network interface card 1 sends the packet to the control plane 1, to obtain the corresponding packet processing rule through learning. As shown in step 2 in FIG. 3, the control plane 1 generates a final accurate packet processing rule through calculation based on the packet and a fuzzy forwarding rule that is related to a virtual network and that is delivered by the SDN controller, that is, completes obtaining of the accurate packet processing rule through learning, and then offload the generated accurate packet processing rule to the smart network interface card 1 by invoking an API. Then, as shown in step 3 in FIG. 3, a subsequent packet sent by the VM 1 to the VM 3 may match the accurate packet processing rule in the smart network interface card 1, and the smart network interface card 1 may directly process and/or forward the packet according to the accurate packet processing rule.

It may be learned that, in the foregoing manner, packet processing rule generation and offloading (that occupy a CPU resource of the computing node) are performed locally on the computing node. Therefore, the SDN controller may need to deliver, to each computing node, all fuzzy forwarding rules, access control rules, and the like that are related to one or more virtual networks. This brings great pressure to the SDN controller, and also occupies a memory resource of each computing node. Especially in a scenario in which a scale of a virtual network is large (for example, a virtual network with a scale of millions of virtual machines), an overall data volume of the foregoing rules is large, it is time-consuming for the SDN controller to deliver these rules to the computing node, and a startup speed of a virtual instance on the computing node is affected. In addition, the foregoing rules occupy a large quantity of memory resources on the computing node, so that resources that can be reserved on the computing node for a virtual instance of a tenant to use are greatly reduced, reliability of the virtual instance is reduced, and the computing node can only carry a small quantity of virtual instances (a virtual instance density is low).

To reduce resource occupation of the computing node, an embodiment of this application provides a packet processing method. A network controller sends tenant network information of at least one virtual instance on one or more virtual networks to a first central node instead of the computing node, to reduce the memory usage of the computing node. The first central node may generate, based on the foregoing information sent by the network controller, a packet processing rule for the computing node, and further offload the packet processing rule to a network interface card on the computing node for storage. In other words, the packet processing rule generation and offloading are migrated to the first central node for implementation, instead of being locally implemented on the computing node, so that the CPU resource of the computing node can be released.

For ease of understanding of technical solutions in embodiments of this application, the following first describes a system architecture in embodiments of this application.

Figure 4:
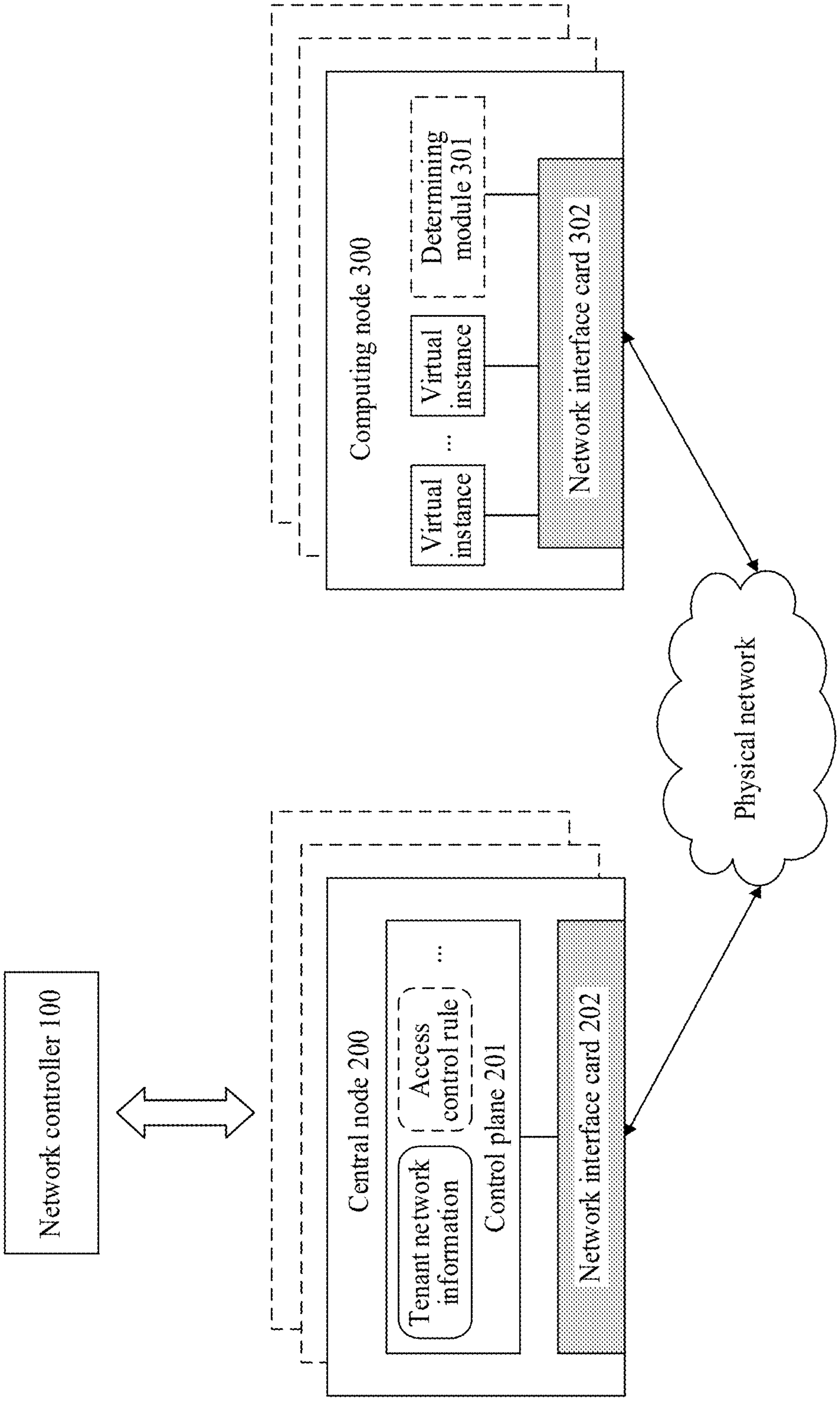
FIG. 4 is a diagram of a cloud system according to an embodiment of this application.

FIG. 4 is a diagram of a cloud system according to an embodiment of this application. The cloud system includes a network controller 100, a central node 200, and a computing node 300. A network interface card 302 is inserted/integrated into the computing node 300. The following separately provides descriptions.

(1) The network controller 100 is configured to send tenant network information of at least one virtual instance on one or more virtual networks to the central node 200.

It should be understood that the virtual network is a virtual logical network constructed on an underlay/basic physical network by using a network virtualization technology, that is, an overlay/overlap network. The virtual network may be implemented based on a network virtualization technology such as network virtualization using generic routing encapsulation (NVGRE) or a VXLAN. This is not limited in this embodiment of this application.

For example, the virtual network may be a VPC implemented based on the VXLAN technology. The VPC is an on-cloud private network built based on a cloud data center, and may provide an isolated and private virtual network environment for on-cloud virtual instance resources, such as a cloud server (that is, a virtual machine), a cloud container, and a cloud database, of a tenant in the cloud data center. Different VPCs are logically isolated. The tenant may configure a VPC of the tenant on a console. For example, the tenant may customize the VPC, divide a subnet in the VPC as needed, configure one or more of a routing and forwarding rule, a bandwidth package, and the like, and may further configure access control rules, such as a security group rule and a network ACL rule, to ensure network security. A security group is a logical group, and provides access control policies for virtual instances, such as a cloud server, a cloud container, and a cloud database, that are on a same VPC and that have a same security protection requirement and that trust each other. After the security group is created, the tenant may define a corresponding security group rule in the security group, so that a virtual instance added to the security group is protected by the rule. A network ACL is a subnet-level optional security layer, and controls a data flow that enters or leaves a subnet based on an inbound/outbound rule associated with the subnet. All virtual instances on the subnet are under access control of a network ACL rule corresponding to the subnet.

It should be noted that tenant network information of a virtual instance on a virtual network refers to a configuration/rule that is related to the virtual instance and that is in all configurations of the virtual network. For example, the tenant may construct a dedicated VPC in the cloud data center, and configure, on the console (in other words, a tenant interface/API provided by a cloud management platform of a cloud service vendor) for (a virtual instance on) the VPC, one or more of some access control rules, packet processing rules, routing and forwarding rules, location information, bandwidth packages, and the like, to meet a requirement of the tenant. For a virtual machine on the VPC, tenant network information of the virtual machine is a part of a configuration/rule that is related to the virtual machine and that is in all configurations of the VPC.

Location information of a virtual instance may include physical location information and virtual location information that are of the virtual instance. The physical location information indicates the computing node 300 on which the virtual instance is located, and may include address information of the computing node 300 on which the virtual instance is located, for example, a network address such as an Internet Protocol (IP) address or a source media access control (MAC) address. The virtual location information indicates a virtual network on which the virtual instance is located and a related configuration of the virtual instance on the virtual network, and for example, may include an identifier of the virtual network on which the virtual instance is located, an identifier of the subnet and/or the security group, a virtual port corresponding to the virtual instance, and the like.

In a possible embodiment, the network controller 100 may receive tenant network information sent by the cloud management platform. A part of the tenant network information (for example, a security group rule) may be configured by the tenant through inputting on the cloud management platform, and a part of the tenant network information may be preset by the cloud management platform. For example, the network controller 100 may be an SDN controller, and may send tenant network information of at least one virtual instance on one or more VPCs to each central node 100 through a southbound interface.

In a possible implementation solution, the tenant network information of the at least one virtual instance on the one or more VPCs includes one or any combination of a subnet forwarding location table, a cross-subnet layer-3 forwarding location table, a security group rule, an access control list rule, and link session information that are of the at least one virtual instance on the one or more VPCs.

In a possible embodiment, tenant network information corresponding to a virtual instance on a virtual network may include an access control rule corresponding to the virtual instance on the virtual network. The access control rule may include a security group rule and/or an access control list rule.

For example, the virtual network is a VPC created by the tenant. The tenant divides the VPC into a subnet 1 and a subnet 2, and sets a corresponding network ACL rule for the subnet 1 to control a data flow that enters or leaves the subnet 1, that is, all virtual instances on the subnet 1 are protected by the network ACL rule. The tenant further sets a security group A on the subnet 1, and defines a security group rule corresponding to the security group A, to control a data flow that enters or leaves the security group A, that is, all virtual instances in the security group A are protected by the security group rule. In other words, all the virtual instances in the security group A are protected by the security group rule of the security group A, and are also protected by the network ACL rule corresponding to the subnet 1. A correspondence exists between both the security group rule of the security group A and a virtual instance in the security group A, and the network ACL rule of the subnet 1 and the virtual instance in the security group A. The central node 200 may record all access control rules (including the security group rule and the network ACL rule) configured by the tenant for the VPC. Therefore, the central node 200 may perform a corresponding access control check function (which is described in detail below) based on these access control rules.

It should be noted that the network controller 100 sends only the tenant network information of the at least one virtual instance on the one or more virtual networks to the central node 200, so that the central node 200 generates an accurate packet processing rule based on the information (the computing node 300 does not need to perform computing for a second time), and delivers the accurate packet processing rule to the computing node 300, instead of sending the foregoing information to the computing node 300. Only the central node 200 stores a fuzzy forwarding rule, for example, an intra-subnet layer-2 forwarding location table, a cross-subnet layer-3 forwarding location table, a security group rule, an ACL rule, and link session information, so that memory usage of the computing node 300 can be greatly reduced. In addition, because a large quantity of fuzzy forwarding rules does not need to be delivered to the computing node 300, a creation speed of a virtual machine or a container on the computing node 300 can be significantly improved. The intra-subnet layer-2 forwarding location table may be, for example, a mapping table from "VXLAN network identifier (VNI)+MAC address of a virtual machine" to "IP address of a remote VXLAN tunnel end point (V VTEP)+local port identifier". The cross-subnet layer-3 forwarding location table may be, for example, a mapping table from "virtual routing forwarding (VRF)+iface IP" to "MAC address of a gateway+MAC address of a virtual machine+VNI+IP address of a remote VTEP".

(2) The central node 200 may be a computing device such as a physical server or a computer in the cloud data center. Alternatively, the central node 200 may include a plurality of computing devices. This is not limited in this embodiment of this application.

The central node 200 is configured to: store the tenant network information that is of the at least one virtual instance on the one or more virtual networks and that is sent by the network controller 100, generate, based on the foregoing information, a packet processing rule for the network interface card 302 on the computing node 300, and further offload the packet processing rule to the network interface card 302. The virtual instance may be a virtual machine, a container, or the like. This is not limited in this embodiment of this application.

In a possible embodiment, as shown in FIG. 4, the central node 200 includes a control plane 201 and a network interface card 202. The network interface card 202 provides a network interface, so that the central node 200 can access a physical network (for example, an internal network of a data center), and can further communicate with the network controller 100 and the computing node 300. The control plane 201 is configured to: generate, based on the locally recorded tenant network information of the at least one virtual instance on the one or more virtual networks, the packet processing rule for the network interface card 302 on the computing node 300, and then send the generated packet processing rule to the network interface card 302 via the network interface card 202, that is, offload the packet processing rule. How the central node 200 generates the packet processing rule for the computing node 300 is described below. Details are not described herein.

In a possible embodiment, the cloud system may have one central node, or may have a plurality of central nodes 200 (that is, a central node cluster). Each central node 200 may receive and record the tenant network information that is of the at least one virtual instance on the one or more virtual networks and that is sent by the network controller 100, and may generate, based on the foregoing information, the packet processing rule for the network interface card 302 on the computing node 300.

Optionally, the plurality of central nodes 200 may record the tenant network information of the at least one virtual instance on the same one or more virtual networks. In this case, the plurality of central nodes 200 may all be responsible for offloading the needed packet processing rule to the network interface card 302 on the computing node 300 on which the at least one virtual instance on the same one or more virtual networks is located. The plurality of central nodes 200 may alternatively record tenant network information of virtual instances on different virtual networks. In this case, the plurality of central nodes 200 may be separately responsible for offloading a needed packet processing rule to a network interface card 302 on a computing node 300 on which the virtual instances on the different virtual networks are located.

For example, assuming that the central node 200 and the computing node 300 are needed to be located in a same region, one or more computing devices in the region may be selected as central nodes 200, and other computing devices in the region are separately used as one computing node 300, to run a virtual instance created by the tenant. The central node 200 may record tenant network information of virtual instances on all virtual networks established in the region. Therefore, the central node 200 may provide a packet processing rule offloading service for network interface cards 302 on all computing nodes 300 in the region.

In a possible embodiment, the central node 200 is further configured to receive and store access control rules that are configured on the one or more virtual networks and that are sent by the network controller 100, so that the access control check function can be implemented on the central node 200. A process in which the central node 200 implements an access control check is described below. Details are not described herein.

In a possible embodiment, the central node 200 may encapsulate, into a tunneling protocol packet by using a tunneling protocol such as a VXLAN-GPE protocol or a GRE protocol, the packet processing rule needed by the network interface card 302, and then send the tunneling protocol packet to the network interface card 302. Correspondingly, the network interface card 302 parses the received tunneling protocol packet to obtain a corresponding packet processing rule, may further record the packet processing rule locally, and further perform corresponding packet processing and/or forwarding according to the locally recorded packet processing rule.

It should be noted that, because the central node 200 locally records the tenant network information of the at least one virtual instance on the one or more virtual networks, an action of calculating an accurate packet processing rule that is originally performed locally on the computing node 300 may now be implemented on the central node 200, and network computing function pooling of the computing node 300 is completed. The central node 200 delivers a generated accurate forwarding rule to the computing node 300, and the computing node 300 may implement corresponding packet forwarding without additional calculation. For example, an accurate forwarding rule may be a mapping from "source IP address+destination IP address+source MAC address+destination IP address+VNI+protocol number+source port+destination port" to "actions (for example, may include setting a source IP, setting a destination IP, setting a source MAC, setting a destination MAC, tunnel_push, and output)".

(3) The computing node 300 may be a computing device such as a physical server or a desktop computer in the cloud data center. This is not limited in this embodiment of this application. One or more computing nodes 300 may exist in the cloud system. This is not limited in this embodiment of this application.

It should be understood that a plurality of computing nodes 300 usually exist in the cloud data center. The computing node 300 is a physical entity used by the cloud data center to provide a virtual instance resource (running the virtual instance created by the tenant) for the tenant, but the tenant usually does not perceive existence of the physical entity. Each computing node 300 in the cloud data center may carry/run one or more virtual instances created by the tenant, that is, the computing node 300 is used as a host machine of the virtual instances. The tenant may deploy a business/service of the tenant based on the virtual instances created by the tenant in the cloud data center. The virtual instance may be a virtual machine, a container, or the like. This is not limited in this embodiment of this application. For ease of description, the virtual instance in the following is mainly described by using a virtual machine as an example, but this does not mean that the virtual instance can only be the virtual machine.

In this embodiment of this application, the network interface card 302 is configured to implement data plane functions (such as packet processing rule matching and packet processing and/or forwarding operations) of a virtual switch. The network interface card 302 may store a packet processing rule delivered by the central node 200. A packet entering the network interface card 302 (which may be a packet from a virtual instance on the computing node 300 or another computing node 300) matches with the packet processing rule locally stored in the network interface card 302. The network interface card 302 may process and/or forward the packet according to the matched packet processing rule.

In an embodiment, as shown in FIG. 4, one or more virtual instances run on the computing node 300, and one network interface card 302 is inserted (or integrated) into the computing node. The network interface card 302 may generate a quantity of virtual functions (VFs) based on an SR-IOV technology, and each VF may be directly connected to a virtual instance and used as a virtual network interface card, so that a kernel of a host (namely, the computing node 300) is bypassed, and a CPU resource of the computing node 300 is not occupied. The network interface card 302 further provides a network interface. A virtual instance running on the computing node 300 may directly access the physical network via the network interface card 302, and can further communicate with a virtual instance running on another computing node 300.

In a possible embodiment, as shown in FIG. 4, the computing node 300 may further include a determining module 301. The determining module 301 may be configured to determine one central node 200 from the central node cluster (including the plurality of central nodes 200). When a packet entering the network interface card 302 cannot match any packet processing rule locally stored in the network interface card 302, the determining module 301 may be responsible for determining one central node 200 from the plurality of central nodes 200, and further forwarding the packet to the determined central node 200 via the network interface card 302. In this way, a corresponding packet processing rule is obtained on the central node 200 through learning, and the packet processing rule obtained through learning is offloaded to the network interface card 302 for storage. How to determine one central node 200 from the plurality of central nodes 200 is described below. Details are not described herein.

Based on the foregoing system architecture, the following describes an embodiment of a packet processing method provided in this application.

Figure 5:
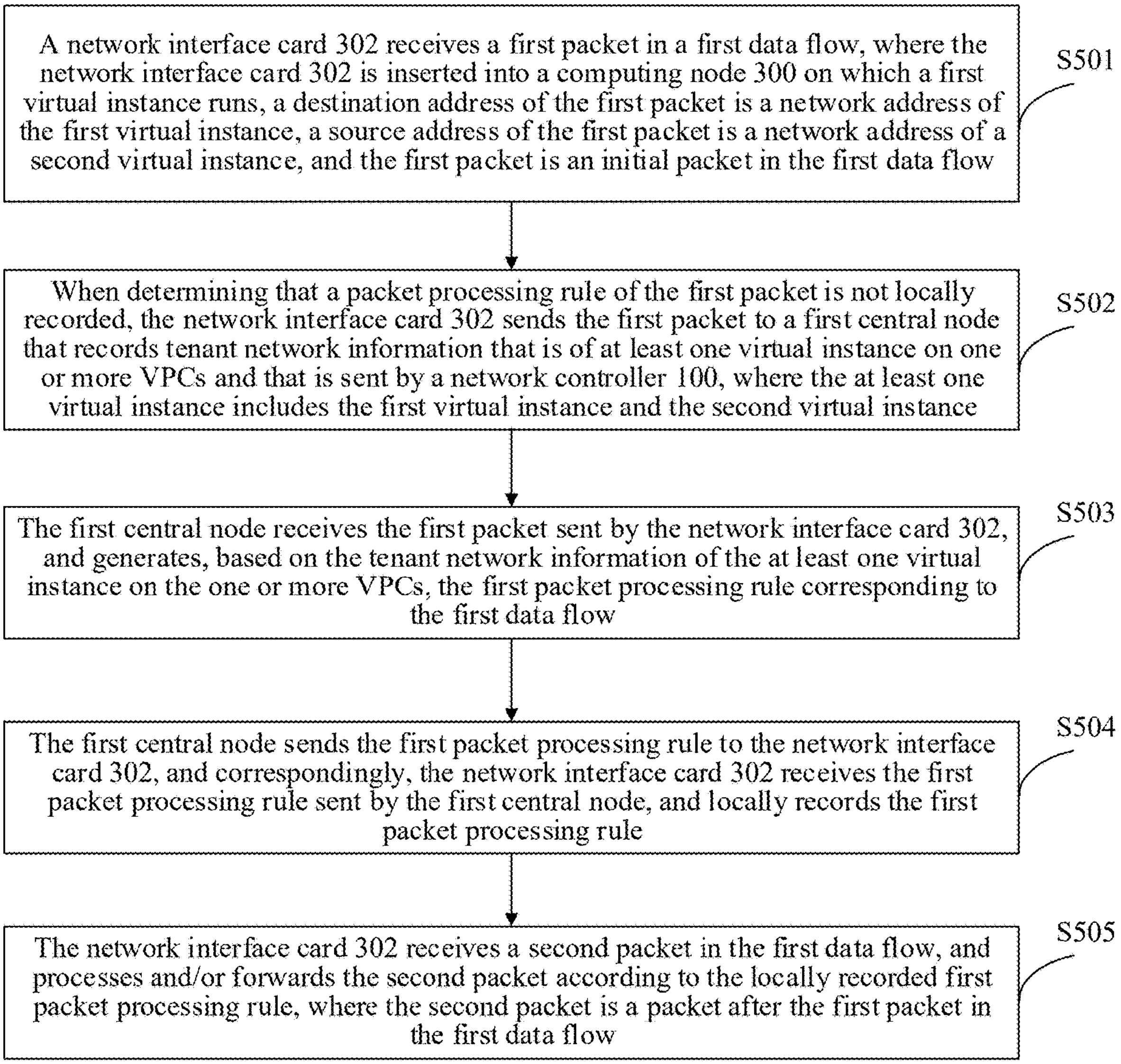
FIG. 5 is a schematic flowchart of a packet processing method according to an embodiment of this application.

FIG. 5 is a schematic flowchart of a packet processing method according to an embodiment of this application. The method may include the following steps.

S501: A network interface card 302 receives a first packet in a first data flow, where the network interface card 302 is inserted into a computing node 300 on which a first virtual instance runs, a destination address of the first packet is a network address of the first virtual instance, a source address of the first packet is a network address of a second virtual instance, and the first packet is an initial packet in the first data flow.

It should be noted that, in a time period, a set of a series of packets having a same attribute that are sent in sequence and that pass through a same network may be abstracted as a flow, or is referred to as a data flow. A criterion for determining the data flow is generally defined by a network administrator. Different policies may be executed for different data flows.

For example, the network administrator may collectively refer to data packets having a same source IP address and a same destination IP address as a data flow. The source IP address and the destination IP address herein are attributes of the data flow. For another example, the network administrator may alternatively classify data packets having a same TCP/IP four-tuple, five-tuple, or seven-tuple into a same data flow. These data packets have same four-tuple, five-tuple, or seven-tuple information. In other words, the four-tuple, five-tuple, or seven-tuple information is an attribute of the data flow. The four-tuple may be a source IP address, a destination IP address, a source port, and a destination port. The five-tuple may be an IP address, a destination IP address, a protocol number, a source port, and a destination port. The seven-tuple may be a source MAC address, a destination MAC address, a source IP address, a destination IP address, a protocol number, a source port, and a destination port.

S502: When determining that a packet processing rule of the first packet is not locally recorded, the network interface card 302 sends the first packet to a first central node that records tenant network information that is of at least one virtual instance on one or more VPCs and that is sent by a network controller 100, where the at least one virtual instance includes the first virtual instance and the second virtual instance.

It should be noted that the network controller 100 may be, for example, an SDN controller or a network control device. This is not limited in this embodiment of this application.

In an embodiment, a packet processing rule includes a match condition and an action.

An OpenFlow technology is used as an example. A flow table in the OpenFlow includes flow entries (in other words, packet processing rules of the OpenFlow), each flow entry has one corresponding flow, and each flow entry indicates a processing manner of the corresponding flow. Each flow entry includes a match domain (in other words, the match condition in the packet processing rule), a counter (used to collect statistics on data traffic-related information), and an action table (in other words, the action in the packet processing rule).

The match domain identifies a flow corresponding to the flow entry, is also referred to as to-be-matched content, includes a plurality of match items/fields, and may cover identifiers of a physical layer (for example, an ingress port), a link layer (for example, a source MAC address and a destination MAC address), a network layer (for example, a source IP, a destination IP, and an IP service identifier), and a transport layer (for example, a source port number and a destination port number). A tenant may customize a match item in the match domain as needed. Each match item may be a wildcard. A network operator may determine to use a flow of a granularity. For example, if the operator may only need to perform routing based on a destination IP address, in the flow entry, only a match item of the destination IP address is valid, and the remaining match items are all wildcards.

In the action table in the flow entry, processing that needs to be performed on a packet that matches the flow entry is defined. In other words, the action table indicates a processing manner of the packet that can match the match domain of the flow entry. For example, the action table may include one or more of processing actions and forwarding actions such as forwarding to a port (an output port), encapsulating or decapsulating the packet, modifying a field in a packet header, discarding the packet, and forwarding to a location (for example, a gateway).

Figure 6:
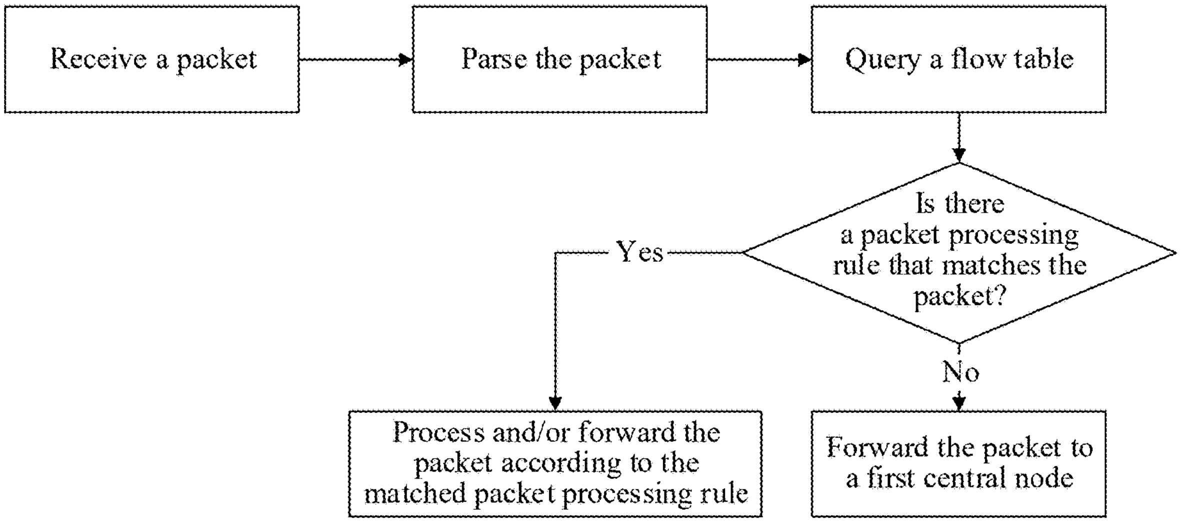
FIG. 6 is a diagram of detecting a status of each central node based on a heartbeat mechanism according to an embodiment of this application.

With reference to FIG. 6, a processing process after the network interface card 302 on the computing node 300 receives the packet is described below by using an example.

When receiving a packet (which may be a packet from a virtual instance on the computing node 300 or another computing node 300), the network interface card 302 on the computing node 300 parses the packet to obtain attribute information (for example, five-tuple information) of the packet. Then, a flow table locally stored in the network interface card 302 is queried. The flow table includes one or more packet processing rules, and each packet processing rule includes a corresponding match condition and a corresponding action. Comparison is performed between an attribute of the packet and a match condition in each packet processing rule in the flow table, to determine whether the packet has a matched packet processing rule in the flow table. If the attribute of the packet meets a match condition in a packet processing rule, it indicates that the packet matches the packet processing rule, and the network interface card 302 may process and/or forward the packet based on an action specified in the matched packet processing rule. If the network interface card 302 does not locally record a packet processing rule that can match the packet, in other words, the packet matches no packet processing rule stored in the network interface card 302, the network interface card 302 cannot determine how to process the packet, and the network interface card 302 forwards the packet to the first central node, to obtain the corresponding packet processing rule through learning. It may be learned from the foregoing descriptions that the first central node records the tenant network information of the at least one virtual instance on the one or more VPCs. Therefore, the first central node may generate an accurate packet processing rule needed by the network interface card 302, and further offload the accurate packet processing rule to the network interface card 302.

In a possible embodiment, there may be one or more central nodes 200. Therefore, one central node 200 (namely, the first central node) may be first determined from the one or more central nodes 200, and then the first packet is forwarded to the determined central node 200.

If there is only one central node 200, the central node 200 is the first central node. In this case, the network interface card 302 may directly send the first packet in the first data flow to the first central node, to obtain, through learning, a packet processing rule corresponding to the first data flow, where the packet processing rule is used to guide how to process a packet in the first data flow. If there are a plurality of central nodes 200 (that is, the central nodes 200 are deployed in a cluster manner), the first central node may be determined from the plurality of central nodes 200 in a plurality of different manners. This is not limited in this embodiment of this application. The following uses Manner 1, Manner 2, and Manner 3 as examples for description.

Manner 1: As shown in FIG. 4, when determining that the network interface card 302 on the computing node 300 does not record the packet processing rule that can match the first packet, the network interface card 302 may send matching failure information to a determining module 301 on the computing node 300. The matching failure information indicates that the network interface card 302 does not have the packet processing rule that matches the current packet (namely, the first packet) to guide how to process the packet. After receiving the matching failure information from the network interface card 302, the determining module 301 may randomly select one central node 200 from the plurality of central nodes 200 as the first central node, or select one central node 200 from the plurality of central nodes 200 as the first central node by using a selection algorithm, and then indicates the network interface card 302 to forward the current packet to the first central node.

The selection algorithm is not limited in this embodiment of this application. For example, a modulo algorithm may be used. Assuming that there are N central nodes 200, where N is a positive integer greater than 1, and the N central nodes 200 have a sequence relationship, the determining module 301 may divide a current quantity of selection times by the quantity N of central nodes. If a remainder is k, a (k+1)th central node 200 is selected as the first central node, where k is a natural number less than N.

Manner 2: A determining module 301 may store an equal-cost multi-path (ECMP) routing table, where the routing table includes a plurality of routing entries respectively destined for the plurality of central nodes 200. As shown in FIG. 4, when determining that the network interface card 302 on the computing node 300 does not have the packet processing rule that matches the first packet, the network interface card 302 may send the first packet to the determining module 301. The determining module 301 may select one routing entry from the ECMP table based on information carried in the first packet (for example, five-tuple information of the first packet, which is not limited in this embodiment of this application). A central node 200 corresponding to the selected routing entry is the first central node. For example, the determining module 301 may perform, based on a consistent hashing algorithm, hash calculation on the five-tuple information carried in a packet header of the first packet, and then determine one routing entry from the ECMP table based on a hash value obtained through calculation, that is, determine the first central node. In addition to the consistent hashing algorithm, another load balancing policy may be used. This is not limited in this embodiment of this application.

Then, the determining module 301 indicates the network interface card 302 to send the first packet to the first central node based on the routing entry. In an embodiment, the network interface card 302 may use the first packet as an inner packet and perform outer encapsulation on the first packet, that is, add an outer packet header, to obtain a packet processing rule request packet. A source address recorded in the outer packet header is a network address of the computing node 300, and a destination address is a network address of the first central node. The network interface card 302 sends the packet processing rule request packet to the first central node based on the routing entry selected by the determining module 301.

Manner 3: When determining that the network interface card 302 does not have the packet processing rule that matches the first packet, the network interface card 302 may notify the determining module 301. Then, the determining module 301 first determines a central node 200 in an online state from the plurality of central nodes 200, then determines the first central node from the central node 200 in the online state, and indicates the network interface card 302 to send the first packet to the first central node. In other words, an offline central node 200 may be excluded by determining whether each central node 200 is in the online state, and the first central node is determined only from the online central node 200. There may be one or more online central nodes 200. If there is only one central node in the online state, the central node may be directly determined as the first central node. If there are a plurality of central nodes 200 in the online state, the first central node may be determined from the plurality of online central nodes 200 with reference to Manner 1 or Manner 2. Therefore, the first packet is sent only to the online central node 200, and is not sent to the offline central node 200, to ensure that the network interface card 302 can obtain a needed packet processing rule through learning, and reliability of packet processing rule offloading is high.

Figure 7:
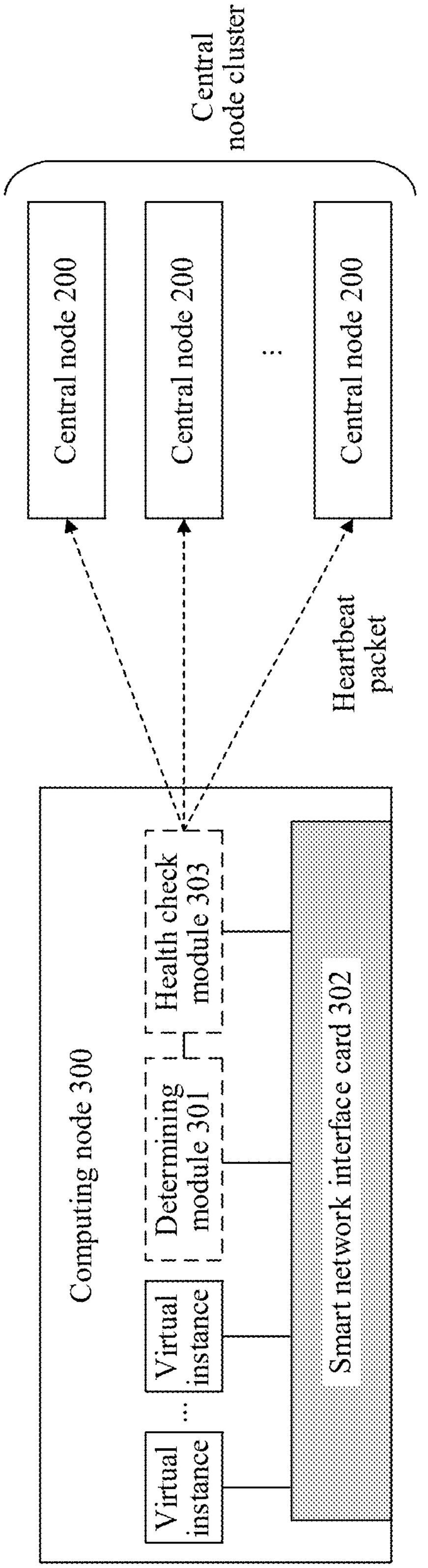
FIG. 7 is a diagram of a packet processing process of a network interface card on a computing node according to an embodiment of this application.

In a possible embodiment, how the determining module 301 determines whether each central node 200 is in the online state may be implemented based on a heartbeat keepalive mechanism. For example, as shown in FIG. 7, the computing node 300 may further include a health check module 303. The health check module 303 may periodically send a heartbeat packet to each central node 200 at a time interval. When receiving the heartbeat packet from the computing node 300, the central node 200 in the online state may send a feedback message to the computing node 300, to notify the computing node 300 that the central node 200 is online. However, the central node 200 in an offline state (where offline may be caused by an upgrade, a restart, a fault, or the like) cannot send a feedback message to the computing node 300 in time, and temporarily cannot provide a packet processing rule offloading service for the computing node 300. Therefore, the health check module 303 may send a heartbeat packet to a central node 200, to determine a status of each central node 200 based on a feedback message. If a feedback message of a central node 200 can be received within specified time, it may be determined that the central node 200 is in the online state. If a feedback message of a central node 200 is not received within specified time, it may be determined that the central node 200 is in the offline state. Therefore, the determining module 301 may obtain status information of each central node 200 from the health check module 303, to determine a central node 200 in the online state, and further select the first central node from the central node 200 in the online state (refer to Manner 1 or Manner 2).

It should be noted that, in the foregoing plurality of manners, functions of the determining module 301 and/or the health check module 303 may alternatively be directly offloaded to the network interface card 302. In other words, the network interface card 302 may determine the first central node from the plurality of central nodes 200 without occupying a CPU resource of the computing node 300.

503: The first central node receives the first packet sent by the network interface card 302, and generates, based on the tenant network information of the at least one virtual instance on the one or more VPCs, the first packet processing rule corresponding to the first data flow.

After receiving the first packet that is in the first data flow and that is sent by the network interface card 302, the first central node may determine, based on the destination address carried in the first packet, a virtual instance (which is the first virtual instance herein) to which the first packet is to be sent, that is, determine a destination virtual instance. It may be learned from the foregoing descriptions of the cloud system that the first central node records the tenant network information of the at least one virtual instance (including the first virtual instance and the second virtual instance) on the one or more VPCs. Therefore, the first central node may generate, based on the tenant network information of the at least one virtual instance on the one or more VPCs, the first packet processing rule corresponding to the first data flow. The first packet processing rule indicates how to process and/or forward the packet in the first data flow.

For the tenant network information, refer to related descriptions of the cloud system. Details are not described herein.

In a possible embodiment, the first central node may send, for storage by using a tunneling protocol, the generated first packet processing rule to the network interface card 302 on the computing node 300. In other words, the first central node may encapsulate the first packet processing rule into a tunneling protocol packet, and then sends the tunneling protocol packet carrying the first packet processing rule to the network interface card 302. Correspondingly, the network interface card 302 parses the received tunneling protocol packet to obtain the first packet processing rule, and further locally records the first packet processing rule, so that a subsequently received packet in the first data flow may be processed and/or forwarded according to the first packet processing rule. The tunneling protocol may be a VXLAN GPE protocol, a GRE protocol, or the like. This is not limited in this embodiment of this application.

It should be understood that, in this embodiment of this application, the packet processing rule is offloaded to the network interface card 302 on the computing node 300 based on the tunneling protocol. This is not related to overheads of an operating system kernel and a network protocol stack that are of the computing node 300, and the CPU resource of the computing node 300 is not occupied, so that efficiency of packet processing rule offloading can be improved. In this way, normal communication can be quickly implemented between virtual instances.

In a possible embodiment, the first central node generates, based on tenant network information of the first virtual instance indicated by the destination address of the first packet, the first packet processing rule corresponding to the first data flow, and generates a first session entry corresponding to the first data flow, where the first session entry includes the first packet processing rule. It should be understood that a session entry records a connection status of a protocol such as TCP, UDP, or ICMP. A connection to which a packet belongs and a corresponding packet processing rule may be determined based on the session entry.

In a possible embodiment, after generating the first packet processing rule corresponding to the first data flow, the first central node may process and/or forward the first packet according to the first packet processing rule.

For example, the first packet processing rule generated by the first central node indicates to send the packet in the first data flow to the computing node 300 on which the first virtual instance is located. Therefore, the first central node may directly perform outer encapsulation processing on the first packet based on an indication of the first packet processing rule, and add the outer packet header. The outer packet header carries the network address of the computing node 300 on which the first virtual instance is located. Then, the first central node sends, to a physical network via a network interface card 202 of the first central node, a first packet encapsulated with the outer header. A network device in the physical network may perform routing/forwarding based on information about the outer packet header, and finally may send the first packet to the network interface card 302 on the computing node 300 on which the first virtual instance is located. The network interface card 302 decapsulates the received packet to obtain the first packet, and further forwards the first packet to the first virtual instance. In other words, after generating the first packet processing rule corresponding to the first data flow, the first central node may directly process and/or forward the first packet in the first data flow, so that the first packet can be sent to the first virtual instance as soon as possible, and a delay of the first packet is reduced.

In a possible embodiment, the tenant network information that is of the first virtual instance and that is recorded on the first central node includes an access control rule corresponding to the first virtual instance. The first central node may generate, according to the access control rule corresponding to the first virtual instance indicated by the destination address of the first packet, the first packet processing rule corresponding to the first data flow. When it is determined, based on the source address of the first packet and the access control rule corresponding to the first virtual instance, that the packet in the first data flow is not allowed to pass through, the first packet processing rule is generated. In this case, a processing action indicated by the first packet processing rule is discarding the packet in the first data flow.

For example, it is assumed that the tenant sets some access control rules on a VPC 1 on which the first virtual instance is located. The access control rules include a security group rule of a security group A, and the security group rule specifies that a packet from an address range is not allowed to pass through. A user sets the first virtual instance in the security group A. In this case, the security group rule of the security group A is the access control rule corresponding to the first virtual instance on the VPC 1. The source address of the first packet indicates the second virtual instance. If the network address of the second virtual instance falls within the address range specified in the security group rule of the security group A, it may be determined that the packet (including the first packet) in the first data flow is not allowed to pass through. In this case, the first central node may generate a corresponding packet processing rule, to indicate to discard the packet in the first data flow, so that the packet from the address range can be prevented from entering the first virtual instance. If the network address of the second virtual instance does not fall within the address range, it may be determined that the packet in the first data flow is allowed to pass through. In this case, the first central node may generate a corresponding packet processing rule, to indicate to forward the packet in the first data flow to the first virtual instance.

It should be noted that processing and forwarding the packet in the first data flow may be: first performing corresponding encapsulation/decapsulation on the packet in the first data flow, performing processing such as rate limiting, traffic-based accounting, or information statistics collection on the packet based on a bandwidth package purchased by the tenant, and then forwarding the packet (which may be an encapsulated packet) in the first data flow to a first virtual instance indicated by a destination address of the packet. If the packet in the first data flow is processed only, a processing operation such as discarding or information statistics collection may be performed on the packet in the first data flow, and a forwarding operation is not performed. If the packet in the first data flow is forwarded only, the packet in the first data flow may be directly forwarded to the first virtual instance indicated by the destination address of the packet; or the packet in the first data flow may be first forwarded to a location with a feature (for example, a communication gateway), instead of being directly forwarded to the first virtual instance indicated by the destination address of the packet.

S504: The first central node sends the first packet processing rule to the network interface card 302, and correspondingly, the network interface card 302 receives the first packet processing rule sent by the first central node, and locally records the first packet processing rule.

In other words, after generating an accurate packet processing rule (namely, the first packet processing rule) based on the first packet sent by the network interface card 302, the first central node offloads the first packet processing rule to the network interface card 302. The network interface card 302 locally records the received first packet processing rule. For example, the received first packet processing rule may be recorded in a storage area/location (for example, a forwarding table or a flow table) that is on the network interface card 302 and that is used to record a packet processing rule.

S505: The network interface card 302 receives a second packet in the first data flow, and processes and/or forwards the second packet according to the locally recorded first packet processing rule, where the second packet is a packet after the first packet in the first data flow.

In other words, after the network interface card 302 obtains, from the first central node through learning, the first packet processing rule corresponding to the first data flow, and locally records the first packet processing rule, the network interface card 302 may directly perform corresponding packet processing and/or forwarding according to the locally recorded first packet processing rule when a subsequent packet in the first data flow arrives at the network interface card 302, and does not need to send the packet to the central node 200.

In a possible embodiment, a packet processing rule expiration mechanism is set in the network interface card 302. When a packet processing rule stored in the network interface card 302 on the computing node 300 meets an expiration condition, the network interface card 302 on the computing node 300 automatically deletes the packet processing rule, to reduce memory usage of the network interface card 302. The expiration condition may be that storage duration exceeds preset duration (or referred to as expiration time/survival time), or non-matching duration exceeds a preset value. This is not limited in this embodiment of this application. Therefore, when the first packet processing rule stored in the network interface card 302 meets the expiration condition, the network interface card 302 actively deletes the first packet processing rule.

In a possible embodiment, after the network interface card 302 deletes the locally recorded first packet processing rule, the computing node 300 receives a third packet in the first data flow, where the third packet is a packet after the first packet in the first data flow. However, in this case, the network interface card 302 does not locally have the packet processing rule corresponding to the first data flow, and the network interface card 302 does not know how to process and/or forward the third packet. Therefore, the network interface card 302 forwards the third packet to the first central node (for a manner of determining the first central node, refer to the foregoing descriptions). When receiving the third packet, the first central node first queries a session table to determine whether there is a session entry that matches the third packet. The first central node finds that the third packet can match the previously generated first session entry (which is previously generated by the first central node based on the first packet in the first data flow) corresponding to the first data flow, that is, determines that the third packet is in the first data flow corresponding to the first session entry. Therefore, the first central node may directly send the first packet processing rule in the first session entry to the network interface card 302 on the computing node 300. The network interface card 302 receives a first packet forwarding rule sent by the first central node, and locally re-records the first packet forwarding rule. Expiration time is recalculated for the first packet forwarding rule. Therefore, the network interface card 302 may process and/or forward the subsequently received packet in the first data flow according to the locally recorded first packet forwarding rule.

It may be understood that, when the central node 200 has a session entry that matches a packet sent by the network interface card 302, it indicates that a packet in a same data flow has been uploaded to the central node 200 and an access control check on the packet succeeds. Therefore, the session entry corresponding to the data flow is generated. Therefore, the central node 200 may directly determine a packet processing rule based on the matched session entry, and further offload the packet processing rule to the network interface card 302 without performing the access control check again. This can reduce performance consumption of the central node 200, and can also improve efficiency of offloading the packet processing rule.

Then, with reference to FIG. 8, a processing process after the central node 200 receives the packet sent by the network interface card 302 is described below by using an example.

Figure 8:
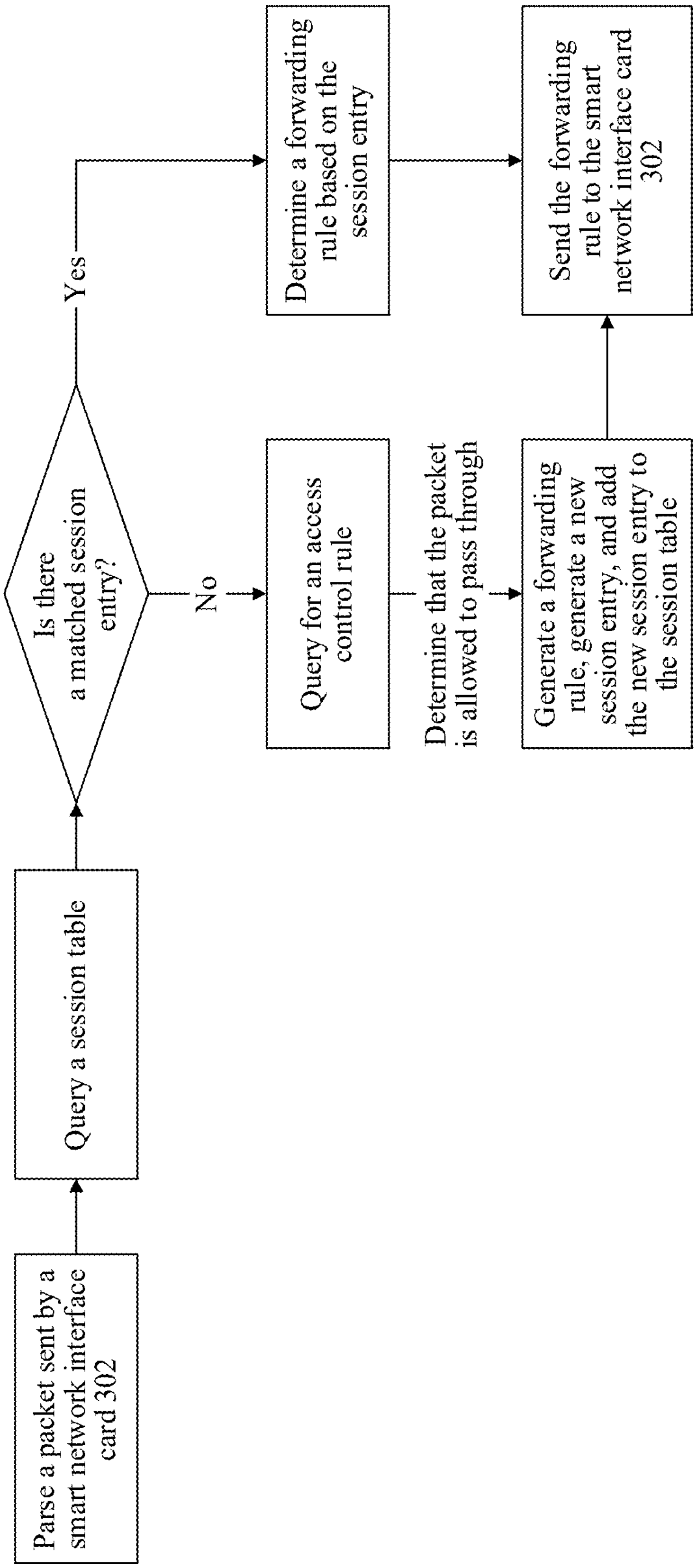
FIG. 8 is a diagram of a packet processing process of a central node according to an embodiment of this application.

As shown in FIG. 8, when receiving a packet sent by a network interface card 302 on a computing node 300, a central node 200 parses the packet to determine an attribute (for example, a five-tuple) of the packet, and further query a session table on the central node 200 based on the attribute of the packet. If the packet can match a session entry in the session table, the central node 200 may directly determine a packet processing rule based on the session entry, and then send the packet processing rule to the network interface card 302 on the computing node 300 for storage. It is clear that, if the packet has the matched session entry, the central node 200 may directly determine the corresponding packet processing rule based on the session entry, and does not need to perform an access control check on the packet, so that time for offloading the packet processing rule can be shortened, and efficiency of offloading the packet processing rule by the central node 200 can be improved. If no session entry that matches the packet exists in the session table, the central node 200 then queries for a corresponding access control rule, to determine whether the packet is allowed to pass through. If it is determined, based on a source address of the packet and an access control rule corresponding to a virtual instance indicated by a destination address of the packet, that the packet is allowed to pass through, a corresponding packet processing rule continues to be generated based on tenant network information of the destination virtual instance indicated by the destination address carried in the packet. In this case, the packet processing rule is for guiding how to forward a packet in a corresponding data flow to the destination virtual instance, a new session entry is generated, and the new session entry is added to the session table. If it is determined, based on a source address of the packet and an access control rule corresponding to a virtual instance indicated by a destination address of the packet, that the packet is not allowed to pass through, a corresponding packet processing rule is generated. In this case, a processing action indicated by the packet processing rule is discarding a packet in a corresponding data flow. Finally, the central node 200 sends, for local storage, the generated packet processing rule to the network interface card 302, to complete offloading of the packet processing rule.

Then, with reference to FIG. 9, overall example descriptions of the packet processing method provided in FIG. 5 are provided below.

Figure 9:
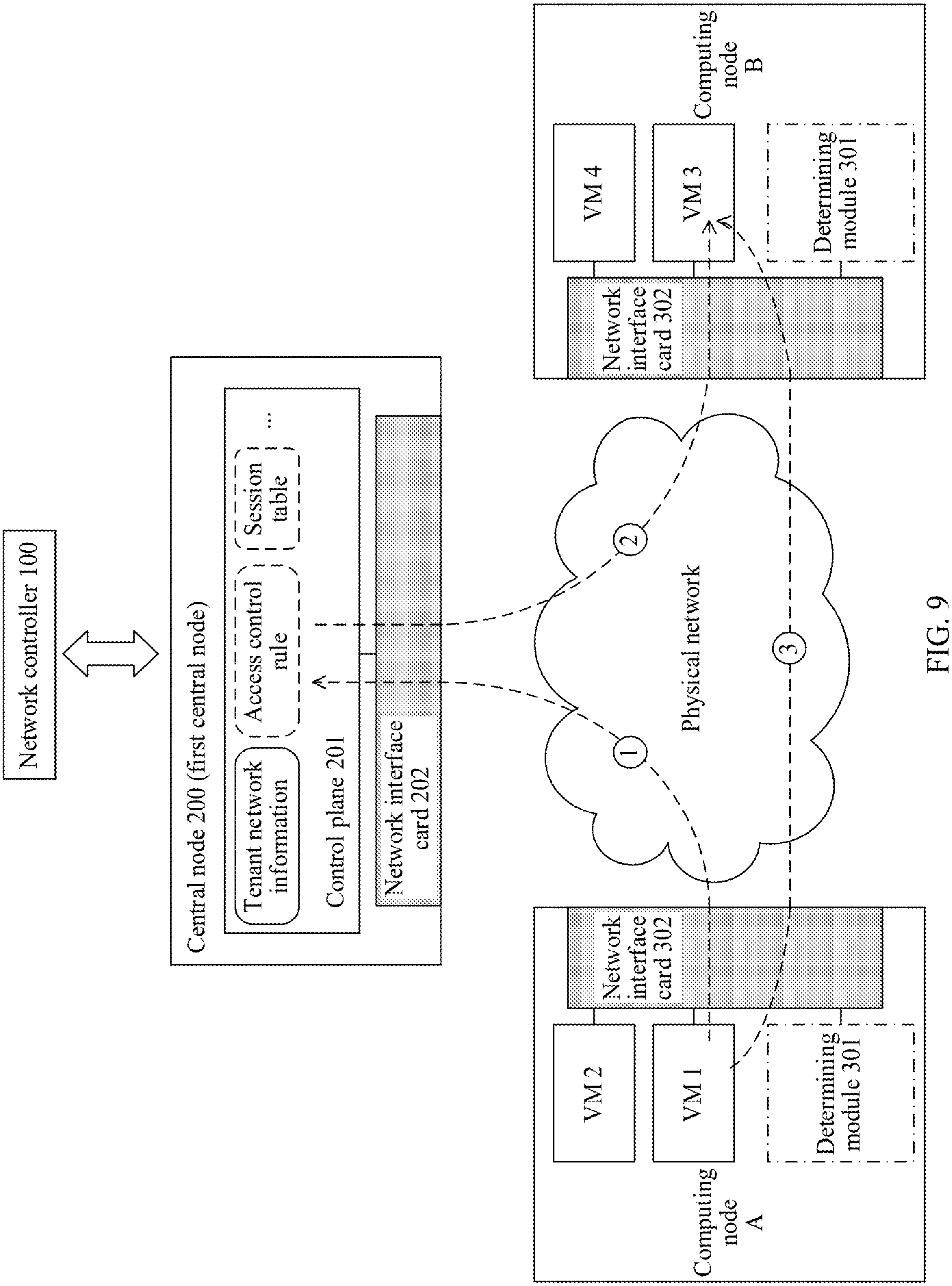
FIG. 9 is a diagram of flow directions of packets among a central node and two computing nodes according to an embodiment of this application.

As shown in FIG. 9, two computing nodes 300 are shown as examples in the figure: a computing node A and a computing node B. Two virtual instances, virtual machines VM 1 and VM 2, run on the computing node A. Two virtual instances, virtual machines VM 3 and VM 4, run on the computing node B. The VM 1 and the VM 3 belong to a same virtual network (which is assumed to be a VPC 1). In this case, the VM 1 on the computing node A needs to communicate with the VM 3 on the computing node B. Therefore, the VM 1 sends a first packet (an initial packet) in a first data flow in current communication to a network interface card 302 on the computing node A. Five-tuple information (a source MAC address, a destination MAC address, a source IP address, a destination IP address, and a protocol number) carried in a packet header of the first packet is sequentially a MAC address of the VM 1, a MAC address of the VM 3, an IP address of the VM 1, and an IP address of the VM 3, and 6 (which indicates a TCP protocol).

As shown in step 1 in FIG. 9, the VM 1 sends the first packet to the network interface card 302 on the computing node A. The network interface card 302 compares the first packet with a packet processing rule in a forwarding table stored in the network interface card 302, and finds that the first packet matches no packet processing rule. In other words, the network interface card 302 on the computing node A does not have a packet processing rule corresponding to the first data flow to guide how to process and/or forward a packet in the first data flow. Therefore, the network interface card 302 sends the first packet to a determining module 301 on the computing node A. The determining module 301 stores an ECMP routing table, where the routing table includes a plurality of routing entries respectively destined for a plurality of central nodes 200. The determining module 301 performs hash calculation based on the five-tuple information carried in the first packet, and then determines one routing entry from the ECMP table based on a hash value obtained through calculation. A central node 200 corresponding to the routing entry is a first central node. Then, the network interface card 302 sends the first packet to the first central node based on the routing entry determined by the determining module 301.

The first central node generates, based on tenant network information of the VM 3 indicated by a destination address of the first packet uploaded by the computing node A, a first packet processing rule corresponding to the first data flow. The first packet processing rule indicates how to process and forward the first data flow. It should be understood that address space of a virtual network is decoupled from address space of a physical network. Both the IP address and the MAC address carried in the packet header of the first packet are addresses in the VPC 1, and are meaningful only in the VPC 1. However, a network device in the physical network needs to use a group of outer header fields pointing to the computing node B, to forward the first packet to the computing node B. Therefore, an action specified in the first packet processing rule generated by the first central node indicates to perform corresponding outer encapsulation on the first packet, and add information about the computing node B to an outer header. For example, a destination address carried in the outer packet header is a network address of the computing node B on which the VM 3 is located. In this way, the network device in the physical network can forward the packet to the computing node B based on the information in the outer header, and further forward the packet to the VM 3. As shown in step 2 in FIG. 9, after generating the first packet processing rule, the first central node may directly perform corresponding encapsulation processing on the first packet according to the first packet processing rule, and then forward an encapsulated first packet to the physical network via a network interface card 202. In this way, the encapsulated first packet can be transmitted to a network interface card 302 on the computing node B through the physical network. Correspondingly, the network interface card 302 on the computing node B may decapsulate the received packet to obtain the first packet, and further forward the first packet to the VM 3.

It should be noted that, when the network interface card 302 on the computing node B obtains the encapsulated first packet, if a matched packet processing rule exists in the network interface card 302, the network interface card 302 may directly perform processing and/or forwarding according to the packet processing rule. However, if no matched packet processing rule exists in the network interface card 302, the network interface card 302 cannot determine how to process and/or forward the packet. Therefore, the network interface card 302 on the computing node B also sends the first packet to a central node 200, to obtain the corresponding packet processing rule through learning. In a possible embodiment, when the computing node A sends the first packet to the central node 200, the central node 200 may generate the first packet processing rule (which indicates to perform corresponding outer encapsulation on the packet in the first data flow, and forward the packet to the physical network through a corresponding port) that corresponds to the first data flow and that is needed by the network interface card 302 on the computing node A, may also generate a second packet processing rule (which indicates to decapsulate a packet and forward a decapsulated packet to the VM 3 through a virtual machine port corresponding to the VM 3) that corresponds to the first data flow and that is needed by the network interface card 302 on the computing node B, and then offload the first packet processing rule and the second packet processing rule to corresponding network interface cards 302 respectively.

As shown in step 3 in FIG. 9, when subsequent packets sent by the VM 1 to the VM 3 arrive at the network interface card 302 on the computing node A, these packets can match the first packet processing rule stored in the network interface card 302. In this case, the packets do not need to be sent to the first central node. The network interface card 302 on the computing node A may directly perform corresponding processing on these packets according to the first packet processing rule and input the packets into the physical network, and then the packets are forwarded to the network interface card 302 on the computing node B. Finally, the packets can be forwarded to the VM 3.

In conclusion, in the packet processing method provided in this embodiment of this application, the network controller 100 does not need to interact with a large quantity of computing nodes 300, but may only need to interact with a small quantity of central nodes 200, and only the tenant network information of the at least one virtual instance on one or more VPCs is sent to each central node 200. In comparison with a solution in which the network controller 100 delivers the foregoing information to each computing node 300, in the method in this embodiment of this application, the network controller 100 does not need to deliver the foregoing information to each computing node 300, so that memory usage of each computing node 300 can be reduced.

In the method in this embodiment of this application, only the central node 200 stores the tenant network information of the at least one virtual instance on the one or more VPCs. The central node 200 is responsible for offloading, to a network interface card 302 on each computing node 300, an accurate packet processing rule needed by the network interface card 302 on each computing node 300. The central node 200 may further implement functions such as an access control check and traffic statistics collection. The network interface card 302 may only need to perform simple packet processing and/or forwarding according to a packet processing rule remotely offloaded by the central node 200. In other words, complex functions (accurate packet processing rule generation and offloading, an access control check, and the like) of a virtual switch are all implemented on the central node 200, and the central node 200 performs functions originally performed by computing nodes 300. This implements centralized processing of a network part. In this way, resources of the computing node 300 may be saved, a CPU resource of the computing node 300 is not occupied, a function of the computing node 300 is simplified, reliability of the computing node 300 is greatly improved, lightweight upgrade of the computing node 300 is facilitated, and costs of the computing node 300 are reduced. The central node 200 further supports cluster deployment, and tenant network information of at least one virtual instance on one or more virtual networks is recorded on each central node 200. Therefore, the network interface card 302 on each computing node 300 may distribute packet processing rule requests to different central nodes 200 in a central node cluster, to reduce pressure of each central node 200 and improve reliability.

In this embodiment of this application, the network interface card 302 excludes the central node 200 in the offline state, and sends the packet only to the online central node 200, so that fault isolation to be performed on the central node 200 and hitless upgrade of the central node 200 can be supported. In other words, that some central nodes 200 go offline due to a factor such as a fault or an upgrade does not affect that the network interface card 302 obtains a needed packet processing rule, and another central node 200 in an online state may still normally provide a packet processing rule offloading service. This ensures high availability. In addition, resources on the central node 200 are pooled (network computing functions of the computing node 300 are pooled), so that the tenant network information (which is one piece of information that provides centralized fuzzy forwarding rule management) that is of the at least one virtual instance on the one or more virtual networks and that is recorded on one central node 200 may meet requirements of a plurality of computing nodes 300. For example, a quantity ratio of the central node 200 to the computing node 300 may be 1:1000, in other words, one piece of information recorded on the central node 200 may meet packet processing rule offloading requirements of network interface cards 302 on thousands of computing nodes 300 related to the virtual network. This may resolve a problem that an overall memory of a cloud data center is severely used.

It should be noted that, in this embodiment of this application, the computing node 300 and the network interface card 302 obtain the needed packet processing rule and forward the packet in a tenant mode. This not related to overheads of an operating system kernel and a network protocol stack that are of the computing node 300. Therefore, time for the network interface card 302 on the computing node 300 to obtain the needed packet processing rule is short (at a microsecond level), so that startup efficiency of a virtual instance on the computing node 300 can be improved. Even in a service scenario in which a large quantity of virtual instances may need to be created, because time overheads of offloading a packet processing rule are extremely low, communication may be quickly implemented between virtual instances, so that a corresponding business service can be quickly provided for a tenant. It should be further noted that the packet processing method in this embodiment of this application is applicable to scenarios such as computing, storage, and virtual instance migration. In a virtual instance migration scenario, according to the method in this embodiment of this application, because time for offloading the packet processing rule is greatly shortened, efficiency of migrating a virtual instance between different computing nodes 300 can be improved.

Figure 10:
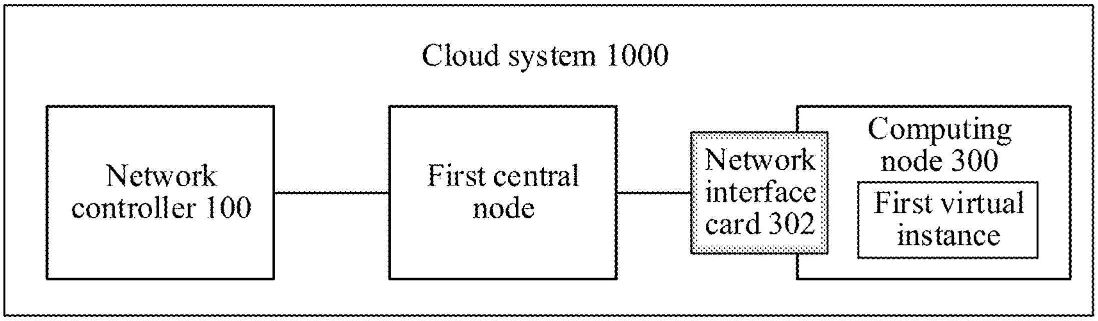
FIG. 10 is a diagram of another cloud system according to an embodiment of this application.

As shown in FIG. 10, this application further provides a cloud system 1000, including a network controller 100, a first central node, and a computing node 300. A network interface card 302 is inserted into the computing node 300.

The computing node 300 is configured to: insert the network interface card 302 and run a first virtual instance.

The network interface card 302 is configured to receive a first packet in a first data flow, where a destination address of the first packet is a network address of the first virtual instance, a source address of the first packet is a network address of a second virtual instance, and the first packet is an initial packet in the first data flow.

The network controller 100 (for example, an SDN controller) is configured to send tenant network information of at least one virtual instance on one or more VPCs to the first central node.

The network interface card 302 is further configured to: when determining that a packet processing rule of the first packet is not locally recorded, send the first packet to the first central node that records the tenant network information of the at least one virtual instance on the one or more VPCs, where the at least one virtual instance includes the first virtual instance and the second virtual instance.

The first central node is configured to: receive the first packet, generate, based on the tenant network information of the at least one virtual instance on the one or more VPCs, the first packet processing rule corresponding to the first data flow, and process and/or forward the first packet according to the first packet processing rule.

The network interface card 302 is further configured to: receive the first packet processing rule sent by the first central node, and locally record the first packet processing rule.

The network interface card 302 is further configured to: process and/or forward, according to the first packet processing rule, a packet after the first packet in the first data flow.

In a possible embodiment, if the tenant network information of the at least one virtual instance on the one or more VPCs includes one or any combination of a subnet forwarding location table, a cross-subnet layer-3 forwarding location table, a security group rule, an access control list rule, and link session information that are of the at least one virtual instance on the one or more VPCs, the first central node is configured to generate the first packet processing rule based on the one or any combination of the subnet forwarding location table, the cross-subnet layer-3 forwarding location table, the security group rule, the ACL rule, and the link session information that are of the at least one virtual instance on the one or more VPCs.

In a possible embodiment, the network interface card 302 is further configured to: determine the first central node from a central node cluster, where the central node cluster includes a plurality of central nodes, and each of the plurality of central nodes records the tenant network information of the at least one virtual instance on the one or more VPCs.

In a possible embodiment, the network interface card 302 is configured to: first determine a central node in an online state from the plurality of central nodes, and then determine the first central node from the central node in the online state.

In a possible embodiment, the network interface card 302 is configured to: receive a second packet in the first data flow, and forward the second packet to the first virtual instance according to the locally recorded first packet processing rule, where the second packet is a packet after the first packet (that is, the initial packet) in the first data flow.

In a possible embodiment, the first central node is further configured to: generate a tunneling protocol packet carrying the first packet processing rule, and then send the tunneling protocol packet to the network interface card 302. Correspondingly, the network interface card 302 is further configured to: receive the tunneling protocol packet sent by the first central node, obtain the first packet processing rule based on the tunneling protocol packet, and locally record the first packet processing rule.

In a possible embodiment, tenant network information of the first virtual instance includes an access control rule corresponding to the first virtual instance, the access control rule includes a security group rule and/or an ACL rule, and the first central node is configured to generate the first packet processing rule when determining, based on the source address of the first packet and the access control rule corresponding to the first virtual instance, that a packet in the first data flow is not allowed to pass through, where the first packet processing rule indicates to discard the packet in the first data flow.

In a possible embodiment, the network interface card 302 is further configured to: when determining that the locally recorded first packet processing rule meets an expiration condition, delete the locally recorded first packet processing rule.

In a possible embodiment, the first central node is further configured to generate a first session entry corresponding to the first data flow, where the first session entry includes the first packet processing rule. After deleting the locally recorded first packet processing rule, the network interface card 302 is further configured to: receive a third packet in the first data flow, and when determining that a packet processing rule of the third packet is not locally recorded, send the third packet to the first central node, where the third packet is a packet after the first packet in the first data flow. The first central node is further configured to: when determining that the third packet is in the first data flow corresponding to the first session entry, send the first packet processing rule in the first session entry to the network interface card 302.

In a possible embodiment, the network interface card 302 is provided with a processor and a memory, and the processor executes instructions in the memory to run an operating system of the network interface card 302.

Both the network controller 100 and the first central node may be implemented by software, or may be implemented by hardware. For example, the following describes an implementation of the network controller 100. Similarly, for an implementation of the first central node, refer to the implementation of the network controller 100.

As an example of a software functional unit, the network controller 100 may include code running on a computing virtual instance. The computing virtual instance may be at least one of computing devices such as a physical host (computing device), a virtual machine, and a container. Further, there may be one or more computing devices. For example, the network controller 100 may include code running on a plurality of hosts/virtual machines/containers. It should be noted that the plurality of hosts/virtual machines/containers used to run an application may be distributed in a same region, or may be distributed in different regions. The plurality of hosts/virtual machines/containers used to run the code may be distributed in a same availability zone (AZ), or may be distributed in different availability zones (AZs). Each AZ includes one data center or a plurality of data centers that are geographically close to each other. Generally, one region may include a plurality of AZs.

Similarly, the plurality of hosts/virtual machines/containers used to run the code may be distributed on a same VPC, or may be distributed on a plurality of VPCs. Generally, one VPC is set in one region. A communication gateway needs to be set on each VPC for communication between two VPCs in a same region or between VPCs in different regions. Interconnection between VPCs is implemented through the communication gateway.

As an example of a hardware functional unit, the network controller 100 may include at least one computing device such as a server. Alternatively, the network controller 100 may be a device implemented by an ASIC, a PLD, or the like. The PLD may be implemented by a CPLD, an FPGA, GAL, or any combination thereof.

A plurality of computing devices included in the network controller 100 may be distributed in a same region, or may be distributed in different regions. The plurality of computing devices included in the network controller 100 may be distributed in a same AZ, or may be distributed in different AZs. Similarly, the plurality of computing devices included in the network controller 100 may be distributed on a same VPC, or may be distributed on a plurality of VPCs. The plurality of computing devices may be any combination of computing devices such as a server, an ASIC, a PLD, a CPLD, an FPGA, and GAL.

It should be noted that the cloud system 1000 may correspond to the cloud system in FIG. 4, and is configured to implement any embodiment of the packet processing method in FIG. 5. For details, refer to the foregoing descriptions. Details are not described herein again.

Figure 11:
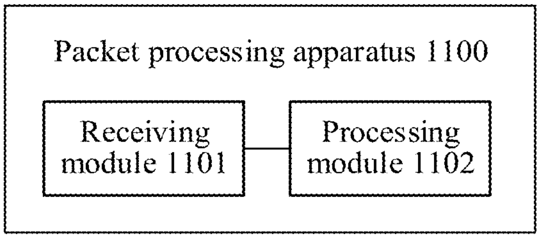
FIG. 11 is a diagram of a structure of a packet processing apparatus according to an embodiment of this application.

Refer to FIG. 11. An embodiment of this application further provides a packet processing apparatus 1100, including a receiving module 1101 and a processing module 1102.

The receiving module 1101 is configured to receive a first packet in a first data flow, where the apparatus is inserted into a computing node on which a first virtual instance runs, a destination address of the first packet is a network address of the first virtual instance, a source address of the first packet is a network address of a second virtual instance, and the first packet is an initial packet in the first data flow.

The processing module 1102 is configured to: when determining that a packet processing rule of the first packet is not locally recorded, send the first packet to a first central node that records tenant network information of at least one virtual instance on one or more VPCs, where the at least one virtual instance includes the first virtual instance and the second virtual instance.

The receiving module 1101 is further configured to receive the first packet processing rule sent by the first central node.

The processing module 1102 is further configured to locally record the first packet processing rule in the apparatus.

The processing module 1102 is further configured to: process and/or forward, according to the first packet processing rule, a packet after the first packet in the first data flow.

In a possible embodiment, the tenant network information of the at least one virtual instance on the one or more VPCs includes one or any combination of a subnet forwarding location table, a cross-subnet layer-3 forwarding location table, a security group rule, an ACL rule, and link session information that are of the at least one virtual instance on the one or more VPCs.

In a possible embodiment, the processing module 1102 is further configured to: determine the first central node from a central node cluster, where the central node cluster includes a plurality of central nodes, and each of the plurality of central nodes records the tenant network information of the at least one virtual instance on the one or more VPCs.

In a possible embodiment, the processing module 1102 is configured to: determine a central node in an online state from the plurality of central nodes, and determine the first central node from the central node in the online state.

In a possible embodiment, the receiving module 1101 is further configured to receive a second packet in the first data flow. The processing module 1102 is configured to forward the second packet to the first virtual instance according to the first packet processing rule locally recorded in the apparatus, where the second packet is a packet after the first packet in the first data flow.

In a possible embodiment, the receiving module 1101 is configured to receive a tunneling protocol packet that is sent by the first central node and that carries the first packet processing rule corresponding to the first data flow. The processing module 1102 is configured to: obtain the first packet processing rule based on the tunneling protocol packet, and locally record the first packet processing rule in the apparatus.

In a possible embodiment, the processing module 1102 is further configured to: when determining that the locally recorded first packet processing rule meets an expiration condition, delete the first packet processing rule locally recorded in the apparatus.

In a possible embodiment, the receiving module 1101 is further configured to receive a third packet in the first data flow, where the third packet is a packet after the first packet in the first data flow. The processing module 1102 is further is configured to: when determining that a packet processing rule of the third packet is not locally recorded, send the third packet to the first central node.

In a possible embodiment, the packet processing apparatus 1100 is provided with a processor and a memory, and the processor executes instructions in the memory to run an operating system of the packet processing apparatus 1100.

Both the receiving module 1101 and the processing module 1102 may be implemented by software, or may be implemented by hardware. For example, the following uses the processing module 1102 as an example to describe an implementation of the processing module 1102. Similarly, for an implementation of the receiving module 1101, refer to the implementation of the processing module 1102.

The module is used as an example of a software functional unit, and the processing module 1102 may include code running on a computing instance. The computing instance may include at least one of a physical host (computing device), a virtual machine, and a container. Further, there may be one or more computing instances. For example, the processing module 1102 may include code running on a plurality of hosts/virtual machines/containers. It should be noted that the plurality of hosts/virtual machines/containers used to run the code may be distributed in a same region, or may be distributed in different regions. Further, the plurality of hosts/virtual machines/containers used to run the code may be distributed in a same AZ), or may be distributed in different AZs. Each AZ includes one data center or a plurality of data centers that are geographically close to each other. Generally, one region may include a plurality of AZs.

Similarly, the plurality of hosts/virtual machines/containers used to run the code may be distributed on a same VPC, or may be distributed on a plurality of VPCs. Generally, one VPC is set in one region. A communication gateway needs to be set on each VPC for communication between two VPCs in a same region or between VPCs in different regions. Interconnection between VPCs is implemented through the communication gateway.

The module is used as an example of a hardware functional unit, and the processing module 1102 may include at least one computing device such as a server. Alternatively, the processing module 1102 may be a device implemented by an application-specific integrated circuit (ASIC), a programmable logic device (PLD), or the like. The PLD may be implemented by a complex programmable logic device (CPLD), a field-programmable gate array (FPGA), generic array logic (GAL), or any combination thereof.

A plurality of computing devices included in the processing module 1102 may be distributed in a same region, or may be distributed in different regions. The plurality of computing devices included in the processing module 1102 may be distributed in a same AZ, or may be distributed in different AZs. Similarly, the plurality of computing devices included in the processing module 1102 may be distributed on a same VPC, or may be distributed on a plurality of VPCs. The plurality of computing devices may be any combination of computing devices such as a server, an ASIC, a PLD, a CPLD, an FPGA, and GAL.

It should be noted that, in another embodiment, the processing module 1102 may be configured to perform any step on a network interface card 302 side in the packet processing method in FIG. 5, and the receiving module 1101 may be configured to perform any step on the network interface card 302 side in the packet processing method in FIG. 5. Steps that the receiving module 1101 and the processing module 1102 are responsible for implementing may be specified as needed. The receiving module 1101 and the processing module 1102 separately implement different steps on the network interface card 302 side in the packet processing method in FIG. 5, to implement all functions of the packet processing apparatus 1100 (which may correspond to the network interface card 302 in FIG. 10).

An embodiment of this application further provides a network interface card, including a processor and a memory. The processor is configured to execute instructions stored in the memory, to enable the network interface card to perform the method in any embodiment on the network interface card 302 side in the packet processing method in FIG. 5.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the protection scope of the technical solutions of embodiments of the present disclosure.

The invention claimed is:

1. A system, comprising:
- a computing node configured to run a first virtual instance of at least one virtual instance;
- a network controller configured to send tenant network information of the at least one virtual instance on one or more virtual private clouds (VPCs);
- a network interface card inserted into the computing node and configured to:
  - receive a first packet that is an initial packet in a first data flow, wherein the first packet comprises a destination address and a source address, wherein the destination address is of the first virtual instance, and wherein the source address is of a second virtual instance of the at least one virtual instance;
  - determine that a first packet processing rule of the first packet is not locally recorded;
  - send the first packet;
  - receive the first packet processing rule;
  - locally record the first packet processing rule; and
  - process or forward subsequent packets after the first packet in the first data flow according to the first packet processing rule; and
- a first central node is configured to:
  - receive the first packet from the network interface card;
  - receive the tenant network information from the network controller;
  - record the tenant network information;
  - generate, based on the tenant network information, the first packet processing rule corresponding to the first data flow;
  - at least one of process or forward the first packet according to the first packet processing rule;
  - process or forward the first packet according to the first packet processing rule; and
  - send the first packet processing rule to the network interface card.

2. The system of claim 1, wherein when the tenant network information comprises at least one of a subnet forwarding location table, a cross-subnet layer-3 forwarding location table, a security group rule, an access control list rule, or link session information that are of the at least one virtual instance on the one or more VPCs.

3. The system of claim 1, further comprising a central node cluster comprising a plurality of central nodes, wherein each of the plurality of central nodes is configured to record the tenant network information, and wherein the network interface card is further configured to determine the first central node from the central node cluster.

4. The system of claim 3, wherein the network interface card is further configured to:
- determine central nodes in an online state from the plurality of central nodes; and
- determine the first central node from the central nodes.

5. The system of claim 1, wherein the network interface card is further configured to:
- receive a second packet in the first data flow; and
- forward the second packet to the first virtual instance according to the first packet processing rule, wherein the second packet is after the first packet in the first data flow.

6. The system of claim 1, wherein the first central node is further configured to:
- generate a tunneling protocol packet carrying the first packet processing rule; and
- send the tunneling protocol packet to the network interface card, and
- wherein the network interface card is further configured to:
  - receive the tunneling protocol packet from the first central node; and
  - obtain the first packet processing rule based on the tunneling protocol packet.

7. The system of claim 1, wherein the tenant network information is of the first virtual instance and comprises an access control rule corresponding to the first virtual instance, wherein the access control rule comprises at least one of a security group rule or an access control list rule, wherein the first central node is configured to further generate the first packet processing rule when determining, based on the source address and the access control rule, that a second packet in the first data flow is not allowed to pass through, and wherein the first packet processing rule indicates to discard the second packet.

8. The system of claim 1, wherein the network interface card is further configured to delete the first packet processing rule when the first packet processing rule meets an expiration condition.

9. The system of claim 8, wherein the first central node is further configured to generate a first session entry that corresponds to the first data flow and that comprises the first packet processing rule, wherein after deleting the first packet processing rule, the network interface card is further configured to:

receive a third packet in the first data flow; and send, when a second packet processing rule of the third packet is not locally recorded, the third packet to the first central node, wherein the third packet is after the first packet in the first data flow, and wherein the first central node is further configured to send, when the third packet is in the first data flow corresponding to the first session entry, the first packet processing rule in the first session entry to the network interface card.

10. The system of claim 1, wherein the network interface card comprises:

a memory configured to store instructions; and a processor coupled to the memory and configured to execute the instructions to run an operating system of the network interface card.

11. A method implemented by a network interface card and comprising:

receiving a first packet in a first data flow, wherein the first packet is an initial packet in the first data flow, wherein the first packet comprises a destination address and a source address, wherein the destination address is a first network address of a first virtual instance, and wherein the source address is a second network address of a second virtual instance;

determining that a first packet processing rule of the first packet is not locally recorded;

sending the first packet to a first central node that records tenant network information of at least one virtual instance on one or more virtual private clouds VPCs, wherein the at least one virtual instance comprises the first virtual instance and the second virtual instance;

receiving, in response to the first packet, the first packet processing rule from the first central node;

locally recording the first packet processing rule; and processing or forwarding, by the network interface card according to the first packet processing rule, a subsequent packet after the first packet in the first data flow.

12. The method of claim 11, wherein the tenant network information comprises at least one of a subnet forwarding location table, a cross-subnet layer-3 forwarding location table, a security group rule, an access control list rule, or link session information that are of the at least one virtual instance on the one or more VPCs.

13. The method of claim 11, wherein before sending the first packet to the first central node, the method further comprises determining, by the network interface card, the first central node from a central node cluster.

14. The method of claim 13, wherein determining the first central node from the central node cluster comprises:

determining central nodes in an online state from a plurality of central nodes of the central node cluster; and determining the first central node from the central nodes.

15. The method of claim 11, wherein the processing or forwarding, by the network interface card according to the first packet processing rule, the subsequent packet comprises:

receiving a second packet in the first data flow, wherein the second packet is after the first packet in the first data flow; and forwarding the second packet to the first virtual instance according to the first packet processing rule.

16. The method of claim 11, wherein receiving, by the network interface card, the first packet processing rule that corresponds to the first data flow and that is from the first central node comprises:

receiving a tunneling protocol packet that is from the first central node and that carries the first packet processing rule corresponding to the first data flow; and obtaining the first packet processing rule based on the tunneling protocol packet.

17. The method of claim 11, further comprising deleting, by the network interface card when the first packet processing rule meets an expiration condition, the first packet processing rule.

18. The method of claim 17, wherein after deleting, the first packet processing rule, the method further comprises:

receiving a third packet in the first data flow, wherein the third packet is after the first packet in the first data flow; and sending, when that a second packet processing rule of the third packet is not locally recorded, the third packet to the first central node.

19. A network interface card, comprising a memory configured to store instructions; and a processor coupled to the memory and configured to execute instructions to cause the network interface card to:

receive a first packet in a first data flow, wherein the network interface card is integrated into a computing node on which a first virtual instance runs, wherein the first packet is an initial packet in the first data flow, wherein the first packet comprises a destination address and a source address, wherein the destination address is a first network address of the first virtual instance, and wherein the source address is a second network address of a second virtual instance;

determine that a first packet processing rule of the first packet is not locally recorded;

send the first packet to a first central node that records tenant network information of at least one virtual instance on one or more virtual private clouds VPCs, wherein the at least one virtual instance comprises the first virtual instance and the second virtual instance;

receive, in response to the first packet, the first packet processing rule from the first central node;

locally record the first packet processing rule; and at least one of process or forward a subsequent packet after the first packet in the first data flow according to the first packet processing rule.

20. The network interface card of claim 19, wherein the processor is further configured to execute instructions to cause the network interface card to receive the first packet processing rule that corresponds to the first data flow and that is from the first central node by:

receiving a tunneling protocol packet that is from the first central node and that carries the first packet processing rule corresponding to the first data flow; and obtaining the first packet processing rule based on the tunneling protocol packet.

* * * * *